(12) United States Patent
Pekoz et al.

(10) Patent No.: US 10,511,338 B2
(45) Date of Patent: *Dec. 17, 2019

(54) NETWORK-AWARE ADJACENT CHANNEL INTERFERENCE REJECTION AND OUT OF BAND EMISSION SUPPRESSION

(71) Applicants: Berker Pekoz, Tampa, FL (US); Selcuk Kose, Tampa, FL (US); Huseyin Arslan, Tampa, FL (US)

(72) Inventors: Berker Pekoz, Tampa, FL (US); Selcuk Kose, Tampa, FL (US); Huseyin Arslan, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/223,198

(22) Filed: Dec. 18, 2018

(65) Prior Publication Data

US 2019/0199384 A1 Jun. 27, 2019

Related U.S. Application Data

(63) Continuation of application No. 16/167,034, filed on Oct. 22, 2018.

(60) Provisional application No. 62/623,330, filed on Jan. 29, 2018, provisional application No. 62/609,866, filed on Dec. 22, 2017.

(51) Int. Cl.
| | |
|---|---|
| *H04B 1/10* | (2006.01) |
| *H04L 27/26* | (2006.01) |
| *H04B 17/336* | (2015.01) |
| *H04L 5/00* | (2006.01) |

(52) U.S. Cl.
CPC ......... *H04B 1/1027* (2013.01); *H04B 17/336* (2015.01); *H04L 27/2607* (2013.01); *H04L 27/2614* (2013.01); *H04L 27/2628* (2013.01); *H04B 2001/1045* (2013.01); *H04L 5/0007* (2013.01)

(58) Field of Classification Search
CPC ......... H04B 1/10; H04B 1/1027; H04B 1/12; H04B 1/1036; H04L 27/2647
See application file for complete search history.

(56) References Cited

U.S. PATENT DOCUMENTS

| | | | |
|---|---|---|---|
| 8,208,567 B2 | 6/2012 | Yeon et al. | |
| 8,509,324 B2 | 8/2013 | Kim et al. | |
| 8,571,136 B1 | 10/2013 | Mahmoud et al. | |
| 8,605,837 B2 | 12/2013 | Wiese et al. | |

(Continued)

OTHER PUBLICATIONS

Ankarali et al., Static Cyclic Prefix Alignment for OFDM-Based Waveforms. Proc. 2016 IEEE Global Commun Conf. Workshops, Washington, DC, Dec. 2016: 1-6.

(Continued)

*Primary Examiner* — Shuwang Liu
*Assistant Examiner* — Gina M McKie
(74) *Attorney, Agent, or Firm* — Molly L. Sauter; Smith & Hopen, P.A.

(57) ABSTRACT

A system and method for adaptively utilizing transmitter windowing, receiver windowing and alignment signals for minimizing interference and maximizing capacity and energy efficiency based upon the received power ratios of links in adjacent bands of a cellular communication network.

22 Claims, 14 Drawing Sheets

(56) References Cited

U.S. PATENT DOCUMENTS

2012/0236731 A1* 9/2012 Beaudin .............. H04W 72/082
　　　　　　　　　　　　　　　　　　　　　　　370/248
2015/0350940 A1* 12/2015 Wilson .................. H04W 24/08
　　　　　　　　　　　　　　　　　　　　　　　370/252
2016/0294441 A1　10/2016 Fazlollahi et al.

OTHER PUBLICATIONS

Tom et al., Suppressing Alignment: Joint PAPR and Out-of-Band Power Leakage Reduction for OFDM-Based Systems. IEEE Transactions on Communications. 2016. vol. 64 (No. 3): 1100-1109.

* cited by examiner

NETWORK-AWARE ADJACENT CHANNEL INTERFERENCE REJECTION AND OUT OF BAND EMISSION SUPPRESSION

CROSS-REFERENCE TO RELATED APPLICATIONS

This application claims priority to U.S. patent application Ser. No. 16/167,034 filed on Oct. 22, 2018, entitled "Network-Aware Adjacent Channel Interference Rejection and Out of Band Emission Suppression" and to U.S. Provisional Patent Application No. 62/623,330 filed on Jan. 29, 2018, entitled "Network-Aware Adjacent Channel Interference Rejection and Out of Band Emission Suppression" and to U.S. Provisional Patent Application No. 62/609,866 filed on Dec. 22, 2017, entitled "Enhancing Performance of Beyond 5G Networks Through Adaptive Windowing and CP Alignment, all of which are incorporated by reference herein in their entirety.

GOVERNMENT SUPPORT STATEMENT

This invention was made with government support 1609581 awarded by the National Science Foundation. The Government has certain rights in the invention.

BACKGROUND OF THE INVENTION

Near-far problem is one of the most critical issues in wireless communication networks, significantly limiting network capacity. Received power of a transmitter's signal located far from a base station is much less than that of a nearer transmitter due to increased propagation losses. Without precautions, the adjacent channel interference (ACI) due to nearer transmitters can severely diminish the signal to interference plus noise ratio (SENR) of the far node's received signal in the uplink (UL) for frequency division multiple accessing (FDNIA) systems, resulting in the far transmitter's signal being undetectable at the base station. Orthogonal frequency division multiplexing (OFDM) is particularly sensitive to this issue. Conventional OFDM transmission emits incontrovertible energy in the out-of-band (OOB), whereas convention reception collects energy from OOB, due to the sine response of the rectangular pulse shape.

Many measures have been proposed to increase the far transmitter's capacity, such as power control and strict timing and frequency synchronization across links. However, these measures limit network capacity and the flexibility of the system. Power control limits the power transmitted by nearer transmitters in an effort to reduce interference, preventing transmitters with higher received powers from communicating at rates they would have otherwise achieved. The strict synchronization demands require the nodes to continuously track the synchronization signals and precisely adjust the transmit timing and frequency, accordingly. This continuous synchronization increases user equipment (UE) power consumption, and the added device complexity and precision requirements increase LTE costs. Furthermore, synchronicity imposes the same waveform with the same parameters to be used by all links in the network, which in the case of OFDM, is the same subcarrier spacing and cyclic prefix (CP) duration. Newer cellular communication generations are planned to allow waveforms with different parameters that are optimal for the link requirements, referred to as numerologies, in adjacent bands. For example, while low power Internet of Things (IoT) devices require smaller subcarrier spacings to converse battery, vehicular communications require higher subcarrier spacing and shorter symbol durations to keep the communication running in high Doppler spreads caused by higher speeds. Such asynchronous transmission is inherently non-orthogonal and interference is unavoidable.

Windowing of OFDM signals is a well-studied interference management technique in the waveform domain that has garnered attention due to its low computational complexity. Windowing can be performed independently at the transmitter to reduce OOB emission, or at the receiver to reduce interference caused by communication taking place in adjacent channels, commonly referred to as adjacent channel interference (ACI). Techniques have been proposed utilizing different window functions for each subcarrier at the transmitter and receiver and derived window functions for each subcarrier that maximizes the spectral localization and interference rejection.

Another critical problem that affects communication systems that use the OFDM waveform is its peak-to-average power ratio (PAPR), or the crest ratio. The PAPR is defined as the ratio of the peak power of the analog waveform to its average power. Before the low-power analog waveform at the output of the digital-to-analog converter is fed to the output of the transmitter; which can be an antenna in a wireless communication system, or a fiber-optical, co-axial or telephone wire or another medium in a wired communication system; it is fed to a power amplifier for amplification of the signal. The simplified relationship between the output voltage and the input voltage of modern power amplifiers assumes two regions; the linear region where the gain of the amplifier is linear if the input voltage is less than the saturation voltage followed by the saturation region for higher voltages. In the saturation region, the output voltage is the maximum output voltage that is supplied by the amplifier regardless of the input voltage, hence the one-to-one relationship between the output and the input is no longer valid. This results in a loss of information as the input cannot be inferred from the output waveform. To avoid such information loss, the output of the digital-to-analog converter is scaled with a coefficient that is less than one prior to feeding it to the power amplifier. This process is referred to as output back-off in the literature, and the coefficient to preserve the one-to-one relationship decreases as the PAPR of the waveform increases. As the waveform is scaled with a smaller coefficient, the average power decreases resulting in reduced signal power at the output. Furthermore, the relationship between the input and the output is also not linear, even in the linear region, for practical amplifiers. The output voltage is in fact a nonlinear function of the input voltage. This nonlinear relationship degrades the output signal, which decreases the signal to noise ratio (SNR) if the degradation is considered a noise, causes subcarriers of a multicarrier signal to interfere with one another, referred to as inter-carrier interference (ICI), and increases the OOB emission. Had the amplitude of the input voltage been constant at all times, it would have been scaled with the same coefficient and the output would not experience any of these problems. Therefore, high PAPR values degrade many aspects of the communication.

A method to reduce the PAPR and OOB emission of the OFDM waveform involves alignment signals. Alignment signals are designed to reduce the PAPR and OOB emission of the signal they are designed for when added to it and are also designed to "align" with the null space of the receiver pulse function upon convolution with the alignment filter. Thus, they minimize the problems that are experienced at the transmitter, and upon convolution with the alignment filter at the receiver, they disappear and do not cause problems to the receiver.

Current methods focus on windowing performed by extending the symbols by an amount which is arbitrarily determined, in addition to standard CP duration, wherein the focus is on deriving window functions optimized according to maximizing standard performance metrics. The currently proposed extensions reduce the symbol rate and change the frame structure defined in the standard, thus creating non-standard signals that are not orthogonal to the symbols that aims to share the same numerology. This is not acceptable in the current cellular communication standards. Furthermore, extending the symbol duration relentlessly causes the symbol duration to exceed the coherence time of the channel, which is a critical problem for high-speed vehicular communications. Attempts have been made to improve spectral efficiency of windowed OFDM systems by utilizing less extension for inner subcarriers and assigning edge subcarriers to users with lower delay spread to use more windowing in edge subcarriers. However, this scheme still dos not comply with the standard frame structure. Additionally, standard compliant schemes have been derived for receiver windowing durations that optimize reception of each subcarrier in the case in which intersymbol interference (ISI) and ACI occur simultaneously and pulse shapes of transmitters operating in adjacent bands cannot be controlled, in the absence of any extension designated for windowing. However, determining whether it is more beneficial to window a duration at the transmitter or receives has not been previously addressed. Current methods focusing on alignment signals use part of the standard CP extension assuming it is not disrupted by anything else, yet again there's no study on the amount of CP to be assigned for alignment signals, especially in combination with transmit and receiver windowing, to optimize network conditions. Furthermore, PAPR and OOB emission are competing goals in the calculation of the alignment signals, and the earlier studies assign weights to each goal randomly. No study has been made to personalize the weights depending on the user's and the network's condition. The design of the filters themselves was not studied either.

Accordingly, what is needed in the art is an improved system and method that optimizes the combination of transmitter windowing, receiver windowing and alignment signals to maximize the overall capacity of the communication network.

SUMMARY OF THE INVENTION

In various embodiments, the present invention provides capacity gains if transmitter and receiver windowing are utilized jointly and adaptively to minimize network interference and maximize network capacity. The invention additionally proposes metrics that can be used to guess the optimum window durations based on the received power of links in adjacent bands, thereby eliminating the need for network-wide optimization.

In one embodiment, the present invention provides, an adaptive windowing method for cellular communication networks which includes, determining a network normalized received power (NNRP) for each of a plurality of links between a transmitter and a receiver in a cellular communication network, ranking the plurality of links based upon the NNRP, maximizing transmitter windowing for links having a higher NNRP ranking and maximizing receiver windowing for links having a lower NNRP ranking.

In the present invention, the network normalized received power (NNRP) for each of the plurality of links is based at least upon a ratio of received power of a link to that of adjacent links and the method further includes optimizing transmitter windowing and receiver windowing to maximize a capacity of the cellular communication network.

In an additional embodiment, the present invention provides a system for adaptive windowing method of cellular communication networks comprising a plurality of transmitters and a plurality of receivers. The system further includes a base station coupled to the plurality of transmitters and to the plurality of receivers, the base station configured for determining a network normalized received power (NNRP) for each of a plurality of links between a transmitter of the plurality of transmitters and a receiver of the plurality of receivers in the cellular communication network, ranking the plurality of links based upon the NNRP, maximizing transmitter windowing for links having a higher NNRP ranking and maximizing receiver windowing for links having a lower NNRP ranking.

In another embodiment, the present invention provides, one or more non-transitory computer-readable media having computer-executable instructions for performing a method of running a software program on a computing device, the computing device operating under an operating system. The method includes issuing instructions from the software program comprising, determining a network normalized received power (NNRP) for each of a plurality of links between a transmitter and a receiver in a cellular communication network, ranking the plurality of links based upon the NNRP, maximizing transmitter windowing for links having a higher ranking; and maximizing receiver windowing for links having a lower NNRP ranking.

Accordingly, the present invention provides an improved system and method which combines adaptive transmitter windowing, receiver windowing and alignment signals based upon network normalized received power (NNRP) for each of a plurality of links between a transmitter and a receiver in a cellular communication network.

BRIEF DESCRIPTION OF FIGURES

FIG. 12 is a graphical illustration of the proportional fair network spectral efficiency for various windowing algorithms as a function of the outpowered user's SNR. The rectangular algorithm refers to the transceiver described in FIG. 2, whereas proposed (simplified) and proposed (optimum) algorithms refer to the algorithms presented in

DETAILED DESCRIPTION OF THE INVENTION

Figure 1A:
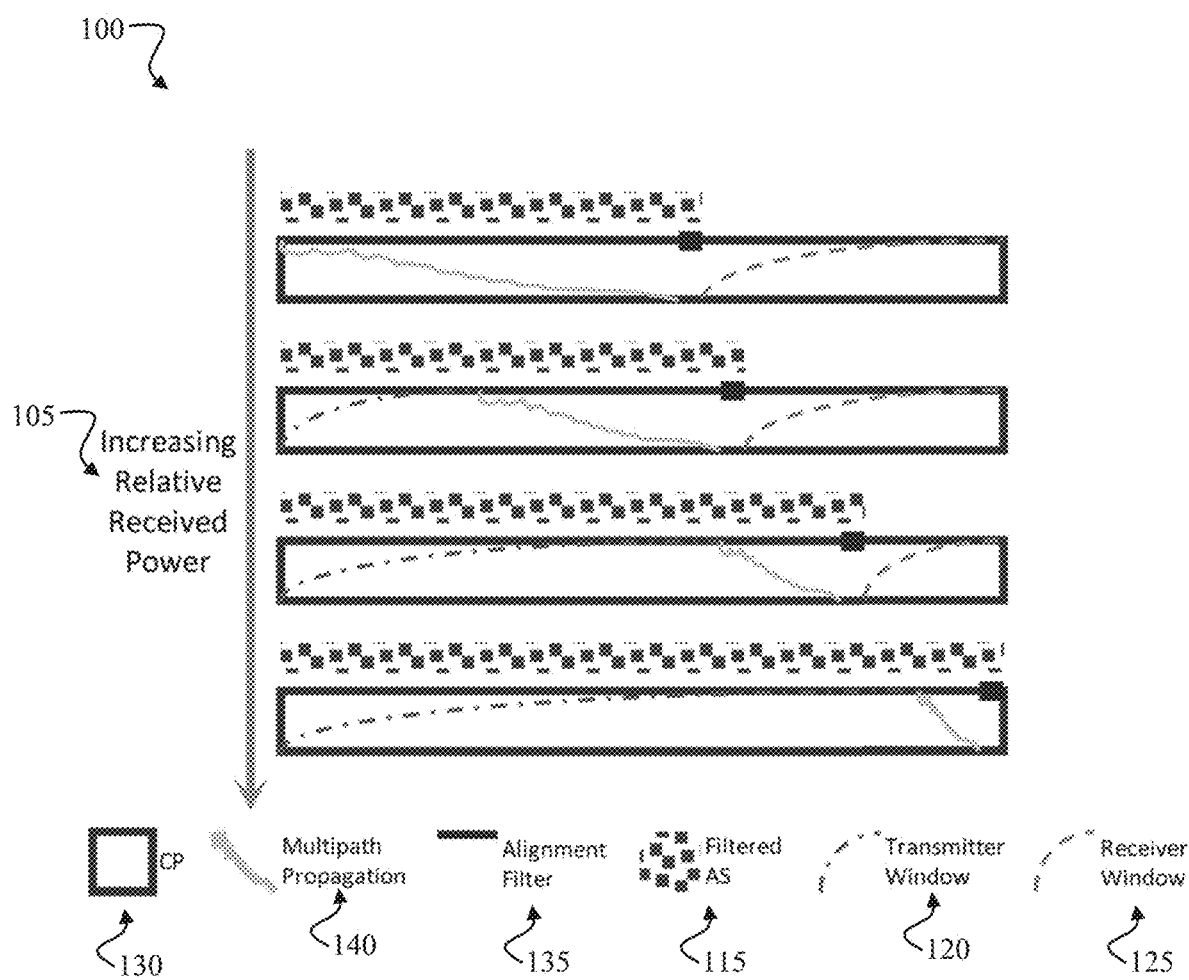
FIG. 1A is a visual demonstration of the adaptive cyclic prefix (CP) methodology, in accordance with an embodiment of the present invention.

The present invention addresses how network capacity can be further improved if the pulse shapes and alignment signals of the transmitters can be coordinated while conserving the standard frame structure, that is, not adding any additional extensions other than CP and using only the present CP for windowing and alignment signals. It is proposed that transmitter and receiver windowing and alignment signals be implemented simultaneously to maximize fair proportional network spectral efficiency with the goal of determining the amount of windowing that should be applied at either side, for each particular use. In various embodiments, the present invention illustrates that the transmitter and receiver windowing duration of each user maximizing the network spectral efficiency can be effectively guessed using the power offset between the user of interest and the users employing adjacent bands. It is also shown that the user with highest received power is the prominent source of ACI impacting other users, whereas the ACI caused by lower powered users utilizing adjacent band has little effect on its spectral efficiency. Therefore, the user with highest receive power must window most of the CP duration at the transmitter for the sake of maximizing the fair proportional network spectral efficiency. Furthermore, while transmitter windowing does not seem to have any obvious benefit to the user applying it, even without alignment signals, it has been shown that even for slower vehicular speeds, such as 30 km/h, the reduction in intercarrier interference (ICI) improves the capacity of the user applying transmitter windowing. On the other hand, reducing ACI caused by the user with the lowest received power was the veriest effect on other users' spectral efficiencies, while the capacity of the user with the lowest received power is limited heavily by the ACI cause by users with higher received power utilizing adjacent bands. Thus, the user with the relatively lowest received power must window most of the clean CP at the receiver and focus on improving their reception, rejecting as much ACI as possible. For nonextreme power offset values, the portion that is adopted for transmitter and receiver windowing can be determined as a function of the power offset.

In various embodiments, the present invention provides a system and method for utilizing windowing and CP alignment based on relative received powers of links in a way that it is beneficial for all nodes in the cell. The link with highest relative received power is the prominent source of OOB leakage, and the OOB leakage of lower powered links transmitting in adjacent bands has little effect on its capacity, which is bounded by PAPR-related distortions. Therefore, the link with highest relative received power windows most of the clean CP at the transmitter, benefiting from longer alignment signal (AS) duration resulting in maximum PAPR reduction, maximizing its capacity. In this context, dirty and clean CP refers to the CP portions that are and are not disturbed by multipath interference, respectively.

Furthermore, the OOB reduction provided by the long transmitter window duration as well as the alignment signal improves the capacity of the rest of the network. The weight for the OOB emission reduction in AS design is higher for the transmitter with the highest network normalized received power to help aid this purpose. Reducing OOB leakage of the link with lowest relative received power, on the other hand, has the veriest effect on other link's capacities, while the capacity of the link with lowest relative received power is limited by the OOB leakage of higher relative received power links operating in adjacent bands. Thus, the link with lowest relative received power uses most of the clean CP duration for receiver windowing, rejecting as much OOB energy as possible, maximizing its capacity. The weight for the PAPR reduction in AS design is increased for the links with lower network normalized received power so that these links further improve their own capacity, which in turn increases the fair proportional network capacity. The links with intermediate relative received powers adopt a portion of clean CP for transmitter windowing, and the remainder for receiver windowing, depending on the ratio of their received power to adjacent links received power. The optimization weights of AS design shift as well from PAPR reduction to OOB emission reduction as relative received power increases from the network minimum to network maximum.

The general scheme 100 of the present invention is visually demonstrated in FIG. 1. As shown in FIG. 1A, the present invention proposes utilizing transmitter windowing and receiver windowing, simultaneously, to maximize network capacity. Generally, the relative received power of a link 105 increases as the distance to the base station (BS) decreases. In the present invention, as the relative received power of a link 105 increases, transmitter windowing 120 increases, hence allowing increased filtered alignment signal duration 115, and receiver windowing 125 decreases. As such, the alignment filter 135 of the link is adjusted, based upon received powers of links and distances to the base station in a way that is beneficial to all links in the cellular communication network. The order of the alignment filter 135 may also depend on the relative received power of a link 105. The CP 130 includes both CP portions that are, and are not, disturbed by multipath interference 140. The relative received power 105 may be calculated by a base station using the received powers of all links in the network or may be calculated for each link depending solely on the received power of the links employing adjacent bands only, either by the base station or by the transmitting links themselves. The CP is used to implement transmitter windowing, receiver windowing and alignment signal operations as well as its initial design goal to accommodate multipath propagation. The duration allocated to implement the transmitter windowing operation increases, whereas the duration allocated to implement receiver windowing decreases as the user's power compared to the rest of the network increases. Another key difference, previously unknown in the art, is that the alignment signal is aligned on top of the transmitter window. Transmitter windowing operation does not benefit the user doing the operation and is performed solely to benefit the network. By allowing the alignment signal to align on top of the transmitter window, the duration allotted to transmitter windowing enables more effective alignment signals by augmenting the null space. This converts transmitter windowing to a technique that also benefits the user applying it.

Figure 1B:
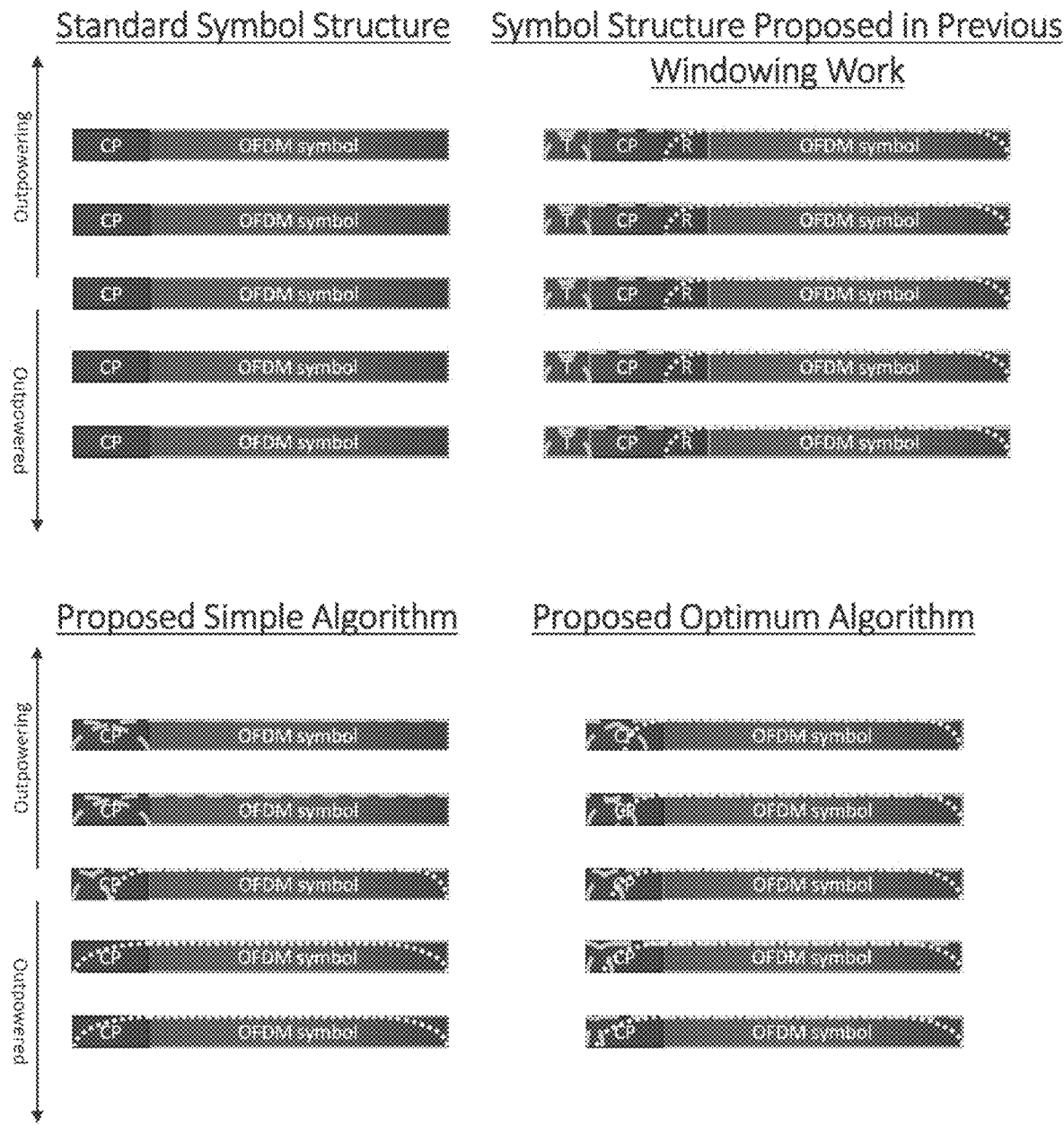
FIG. 1B is a visual demonstration of the standard symbol structure and the symbol structure proposed by previous windowing schemes in addition to the simplified and optimized windowing scheme of adaptively using the readily available CP for windowing in either transmitter or receiver side depending upon the power offset, without utilizing alignment signals, as proposed by the present invention.

The standard symbol structure and the symbol structure proposed by previous windowing work is shown in FIG. 1B, along with the simplified and optimized idea of adaptively using the readily available CP for windowing in either side, depending upon the power offset, as proposed by the present invention. This figure represents a partial algorithm that only utilizes joint transmitter and receiver windowing and does not include the alignment signals. If no alignment signals are utilized, the transmitter and receiver windowing operations are not exclusive, and the tails of the windows can overlap, which was also not possible with previous art. As shown in FIG. 1B, the width of the rectangles represent allowed times for the actual OFDM symbol, CP, and further cyclic extensions for "T" transmitter and "R" receiver windowing, while dashed overlays and the round dot overlays demonstrate transmitter and receiver windowing of the underlying area, respectively. Previous windowing techniques known in the art affix additional extensions, thus breaking the standard symbol structure and they do not focus on the amount of these extensions and when they must be used. In contrast, the implementation of the windowing scheme of the present invention does not change the standard structure and focuses on how the readily available extension should be used as a function of the power offset between user communicating in adjacent bands. Numerical results confirm that fair proportional network spectral efficiency can be increased greatly without disrupting the standard frame structure by utilizing CP adaptively, and that power offset between user utilizing adjacent bands is a clear metric in determining the side to apply windowing.

Figure 2:
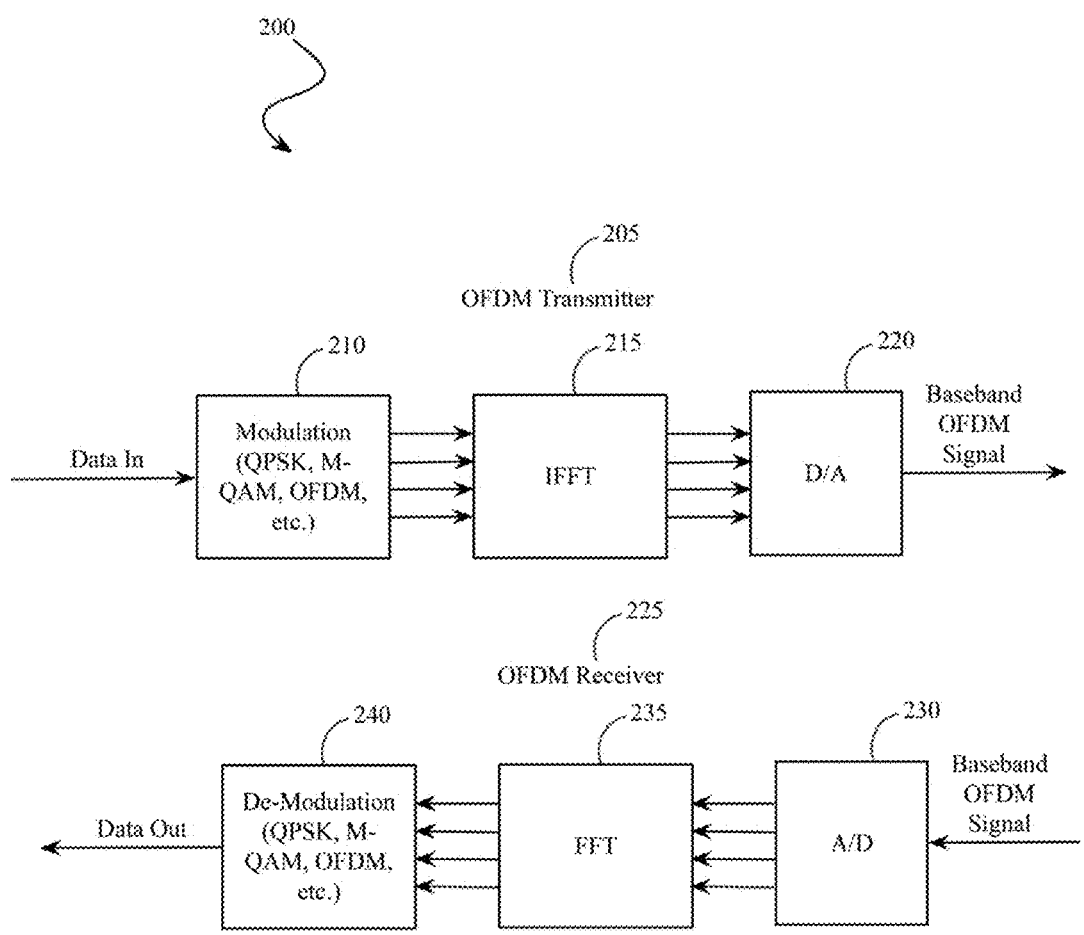
FIG. 2 is an illustration of a conventional OFDM-based system on which various methods of the present invention are built upon.

As shown with reference to FIG. 2, part of the method of the present invention may be employed in system 200 comprising an OFDM transmitter 205 and/or an OFDM receiver 225. As shown with reference to FIG. 2, the OFDM transmitter 205 includes a modulation module 210 configured to receive incoming data bits and to generate digital modulated symbols comprising a plurality of symbols. The OFDM transmitter 205 additionally includes an Inverse Fast Fourier Transform (IFFT) module 215 to receive the plurality of modulated symbols from the modulation module 210. The IFFT module 215 receives incoming symbols to generate an OFDM-based signal comprising a plurality of subcarriers. The IFFT module 215 operates as a transmitter filter to filter the subcarriers of the OFDM-based signal using the proposed subcarrier specific based windowing scheme to generate a filtered OFDM-based signal. The filtered OFDM-based signal is then provided to a digital-to-analog module 220 of the transmitter prior to transmission of the filtered OFDM-based signal over the channel to a base station (not shown). In addition, the OFDM receiver 225 includes an analog-to-digital module 230 configured to receive incoming OFDM-based signals comprising a plurality of subcarriers that has been transmitted over the channel from the base station. The analog-to-digital module 230 provides the digital representation of the OFDM-based signals to a Fast Fourier Transform (FFT) module, operating as a receiver filter 235 to filter the subcarriers of the OFDM-based signal using the proposed subcarrier specific windowing scheme of the present invention to generate a filtered OFDM-based signal. The filtered OFDM-based signal is then provided to a demodulation module 240 of the receiver.

The whole method of the present invention is employed in a system comprising a transmitter and receiver windowed OFDM with alignment signal transmitter 300 and a transmitter and receiver windowed OFDM with alignment signal receiver 400. The transmitter and receiver windowed OFDM with alignment signal transmitter 300 is illustrated in 3A and the transmitter and receiver windowed OFDM with alignment signal receiver 400 is illustrated in FIG. 3B.

Figure 3A:
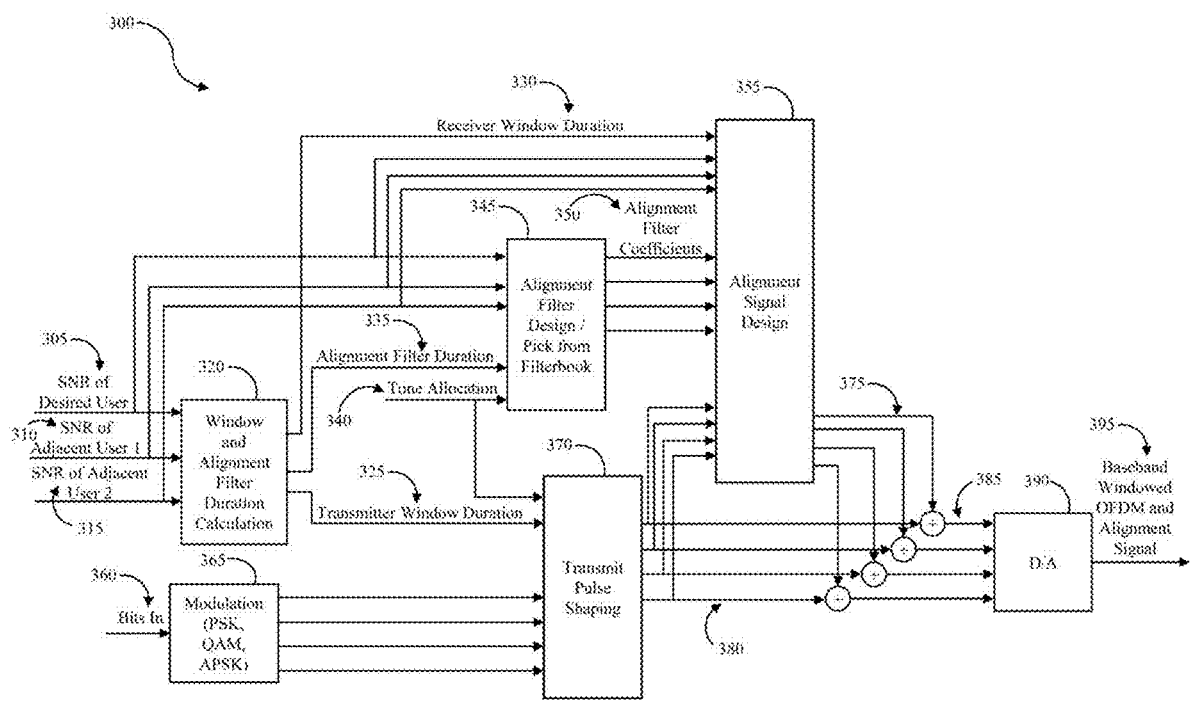
FIG. 3A is an illustration of the transmitter of the advanced transmitter and receiver windowing OFDM coupled with alignment signals. The IFFT operation of the conventional transmitter is performed within transmit pulse shaping in the transmitter windowing implementation.

With reference to FIG. 3A, in one embodiment, the SNR of a desired user of interest 305, the SNR of a first adjacent user 310 and the SNR of a second adjacent user 315 may be provided to the window and alignment filter duration calculation module 320 to obtain the optimum transmitter window duration, the optimum receiver window durations 330 and the optimum alignment filter duration 335 of the user of interest. In this embodiment, the SNR of the user of interest 305 and the SNR of two adjacent users 310, 315 are used in the calculation of the window and alignment filter duration, however in alternate embodiments, the NNRP of the user of interest may be used for the calculation or the SNRs of all the users that are used to calculate the network NRPs may be used to perform the calculation.

In this embodiment, the resulting alignment filter duration 335, the tone allocation 340 of the user of interest, the SNRs of the user in interest and the users utilizing adjacent bands are provided to the alignment filter design module 345 for the user of interest. This module 345 may be designing an optimum finite impulse response (FR) filter from the values given; or a book of FIR filter coefficients may be designed before the device was manufactured and be recorded on the device on an electronic medium, and the module 345 may be choosing the filter that best fits the values provided to it. When calculating the optimum FIR filter coefficients, the optimization used in module 345 may give more importance to suppressing the interference coming from the adjacent user with higher SNR. In various embodiments, when calculating the optimum FIR filter coefficients, the optimization used in module 345 may also take into account the NNRP of the user in interest, or the SNRs of all users that are used to calculate the network NNRPs, or the SNRs of only the user in interest and the users utilizing adjacent bands to calculate coefficients with a more uniform powered impulse response profile, as filters with such traits provide better PAPR suppression, if the desired user is outpowered. In the case of optimum FIR filter design, the filter coefficients 350 must be submitted to the transmitter and receiver windowed OFDM with alignment signal receiver 400 through a separate communication channel, or in the case of using a predefined filter, the index of the filter from the filterbook must be submitted to the transmitter and receiver windowed OFDM with alignment signal receiver 400 of FIG. 3B. At the same time, the bits of the desired user 360 are modulated at a modulation module 365 using any desired digital modulation technique, which may be PSK, QAM or APSK. The resulting symbols are then modulated to tones allocated to the user of interest by filtering them with the transmit pulse shaping filters of each tone by the transmit pulse shaping module 370. The transmit pulse shaping module 370 calculates the transmit pulse shape of each tone by convolving the Fourier transform matrix column associated with that tone, extended periodically by the GP duration minus the transmitter window duration, with the discrete prolate spheroidal sequence associated with that tone for the provided transmitter windowing duration. The samples obtained at the output of the transmit pulse shaping module 370 and the alignment filter design module 345 and the SNRs of desired and users adjacent to desired 305, 310, 315 are provided to the alignment signal design module 355 along with the calculated receiver window duration 330 so that the alignment signal is designed. The alignment signal design module 355 takes into account the SNRs of desired and users adjacent to desired 305, 310, 315 to determine the weight between PAPR suppression or OOB emission for the user in interest. The receiver window duration 330 reveals the null space of the receiver pulse shape. The designed alignment signal 375 is then added to the transmit samples 380 and the resulting samples 385 are fed to the digital-to-analog converter module 390 for transmission over the transmission medium 395.

Figure 3B:
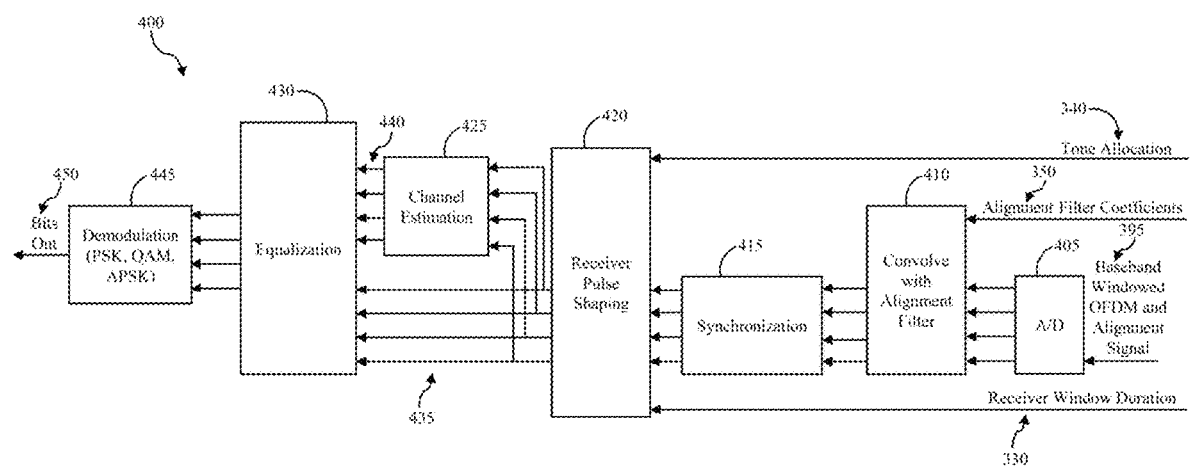
FIG. 3B is an illustration of the receiver of the advanced transmitter and receiver windowing OFDM coupled with alignment signals. The ITT operation of the conventional receiver is performed within receive pulse shaping in the receiver windowing implementation.

With reference to FIG. 3B, after propagating through the transmission medium, combined with the signals transmitted for other links, which are obtained using a similar procedure, the waveform 395 arrives at the transmitter and receiver windowed OFDM with alignment signal receiver 400. The received waveform is quantized and sampled by the analog-to-digital conversion module 405. The digital signal is then filtered 410 with the alignment filter coefficients 350 at a convolve with alignment filter module 410, wherein the alignment filter coefficients 350 are the same coefficients used by the transmitter 300. Time and frequency synchronization is performed to the filtered samples using the synchronization module 415 using known symbols implemented in the transmitted waveform, the tone allocation 340 and the receiver window duration 330 from the transmitter 300. The alignment filter coefficients 350 and the receiver window duration 330 may be communicated to the receiver from another communication channel, or the receiver may also have a duplicate window and alignment filter duration calculation module 320 and alignment filter design module 345 and calculate these values using its knowledge of 305, 310, 315. Receiver pulse shaping 420 is applied to synchronized samples, where the receiver pulse shape of each tone allocation 340 is obtained by convolving the discrete prolate spheroidal sequence corresponding to that tone with the Fourier matrix row corresponding to that tone. Channel is estimated by the channel estimation block 425 using the received symbols and known symbols located within data symbols, similar to synchronization 415, and unknown channel coefficients between estimated channel coefficients are estimated from the estimated channel coefficients. The received symbols 435 and channel coefficients 440 are fed to the equalization block 430 to remove the effect of the channel from the received symbols 435. The equalized symbols are demodulated at a demodulation module 445 to obtain the received bits 450 at the receiver 400.

In accordance with one exemplary embodiment of the system and method of the present invention, links are given indices $u \in \{1, 2, \ldots, U\}$ in the order they are utilizing the spectrum. Pilot tones are used for synchronization and channel estimation to better demonstrate the gains of reduced interference on capacity. In the following discussion, $(\bullet)^T$ and $(\bullet)^H$ denote the transpose and Hermitian operations, $0_{a \times b}$ and $1_{a \times b}$ denotes matrices or zeros and ones with a rows and b columns, ding (v) returns a square diagonal matrix with the elements of vector v on the main diagonal, $\mathcal{C} \mathcal{N} (\mu, \sigma^2)$ represents complex Gaussian random vectors with mean $\mu$ and variance $\sigma^2$, and toep(c, r) corresponds to the Toeplitz matrix of which first column is c and first row is r. Wherein the uth link's base time domain samples $$\Xi_u \in \mathbb{C}^{K_u + N_u + K_{T_u} \times I_u}$$

are obtained using:

$$\Xi_u = \sum_{m=1}^{M_u} A_{u,m} F_{u,m}^{\mathcal{H}} (Q_{u,m} + D_{u,m}) \tag{1}$$

where $Q_{u,m} \in \mathbb{C}^{1 \times I_u}$ and $D_{u,m} \in \mathbb{C}^{1 \times I_u}$ are row vectors consisting of pilot and data symbols to be transmitted by uth link's mth subcarrier, respectively, $M_u$ is the number of subcarriers employed by uth link in each OFDM symbol, $I_u$ is the number of OFDM symbols the uth link transmits in a packet, $N_u$ is the fast Fourier transformation (FFT) size utilized by uth links transmitter, $F_{u,m} \in \mathbb{C}^{1 \times N_u}$ is a row of the normalized $N_u$-point FFT matrix corresponding to the mth subcarrier of uth user, and the CP (cyclic prefix) addition and transmitter windowing matrix $$A_{u,m} \in \mathbb{R}^{K_u + N_u + K_{T_u} \times N_u}$$

shown in (2) uses uth link's mth subcarrier's transmitter window's ramp-up tail coefficients $w_{T_{u,m}} \in \mathbb{R}^{K_{T_u}}$, where $K_u$ is the total number of uth link's CP samples and $K_{T_u}$ is the number of ramp-up tail coefficients of the transmitter window function.

$$A_{u,m} = \begin{bmatrix} 0_{K_{T_u} \times K_{T_u}} & 0_{K_{T_u} \times N_u - K_u - K_{T_u}} & \text{diag}(w_{T_{u,m}}) & 0_{K_{T_u} \times K_u - K_{T_u}} \\ 0_{K_u - K_{T_u} \times K_{T_u}} & 0_{K_u - K_{T_u} \times N_u - K_u - K_{T_u}} & 0_{K_u - K_{T_u} \times K_{T_u}} & I_{K_u - K_{T_u}} \\ I_{K_{T_u}} & 0_{K_{T_u} \times N_u - K_u - K_{T_u}} & 0_{K_{T_u} \times K_{T_u}} & 0_{K_{T_u} \times K_u - K_{T_u}} \\ 0_{N_u - K_u - K_{T_u} \times K_{T_u}} & I_{N_u - K_u - K_{T_u}} & 0_{N_u - K_u - K_{T_u} \times K_{T_u}} & 0_{N_u - K_u - K_{T_u} \times K_u - K_{T_u}} \\ 0_{K_{T_u} \times K_{T_u}} & 0_{K_{T_u} \times N_u - K_u - K_{T_u}} & I_{K_{T_u}} & 0_{K_{T_u} \times K_u - K_{T_u}} \\ 0_{K_u - K_{T_u} \times K_{T_u}} & 0_{K_u - K_{T_u} \times N_u - K_u - K_{T_u}} & 0_{K_u - K_{T_u} \times K_{T_u}} & I_{K_u - K_{T_u}} \\ \text{diag}(1_{K_{T_u} \times 1} - w_{T_{u,m}}) & 0_{K_{T_u} \times N_u - K_u - K_{T_u}} & 0_{K_{T_u} \times K_{T_u}} & 0_{K_{T_u} \times K_u - K_{T_u}} \end{bmatrix} \quad (2)$$

Ramp-up and ramp-down transmitter window tails of consecutive symbols are overlapped to form the transmit windowed samples matrix $X_u \in \mathbb{C}^{N_u + K_u \times I_u + 1}$:

$$X_u = [I_{K_u + N_u} \quad 0_{K_u + N_u \times K_{T_u}}] \times [\Xi_u \quad 0_{K_u + N_u \times K_{T_u} \times 1}] + \begin{bmatrix} 0_{K_{T_u} \times K_u + N_u} & I_{K_{T_u}} \\ 0_{K_u + N_u - K_{T_u} \times K_u + N_u} & 0_{K_u + N_u - K_{T_u} \times K_{T_u}} \end{bmatrix} \times [0_{K_u + N_u \times K_{T_u} \times 1} \quad \Xi_u] \quad (3)$$

The alignment filter coefficients of uth link, $g_u \in \mathbb{C}^{K_{A_u} \times 1}$ are used to construct the alignment convolution matrix $G_u \in \mathbb{C}^{(K_u + N_u) \times (K_u + N_u)}$, where $G_u = \text{toep}([g_u; 0_{K_u + N_u - K_{A_u} \times 1}], [g_u(1), 0_{1 \times (K_u + N_u - 1)}])$. If $B_{u,m} \in \mathbb{R}^{N_u \times N_u + K_u}$ is the nth link's CP removal and receiver windowing matrix used in the reception of the mth subcarrier shown in (6).

$$B_{u,m} = \begin{bmatrix} 0_{N_u - K_{R_u} \times K_u - K_{R_u}} & 0_{N_u - K_{R_u} \times K_{R_u}} & I_{N_u - K_{R_u}} & 0_{N_u - K_{R_u} \times K_{R_u}} \\ 0_{K_{R_u} \times K_u - K_{R_u}} & \text{diag}(w_{R_{u,m}}) & 0_{K_{R_u} \times N_u - K_{R_u}} & \text{diag}(1_{K_{R_u} \times 1} - w_{R_{u,m}}) \end{bmatrix} \quad (6)$$

Where $K_{R_u}$ is the duration of the receiver window ramp and $w_{R_{u,m}} \in \mathbb{R}^{K_{R_u}}$ is the uth link's mth subcarrier's receiver window's ramp-up tail coefficients. Then the alignment signal precoder $P_u \in \mathbb{C}^{(N_u + K_u) \times (K_u - K_{R_u})}$ is obtained as $P_u = \ker(B_{m,u} G_u)$ for any m. Then uth link's alignment signal matrix $S_u^* \in \mathbb{C}^{(K_u - K_{R_u}) \times I_u}$ is calculated accordingly as $$S_u^* = \underset{S_u}{\arg\min}(1 - \lambda_u)\|F_O(X_u + P_u S_u)\|_2 + \lambda_u \|X_u + P_u S_u\|_\infty$$

subject to $B_{m,u} G_u P_u S_s$ for any m and $\|P_u S_u\|_2 \leq \sqrt{\alpha}\|X_u\|_2$, where $F_O$ consists of the rows of the $N_u$-point Fourier transform matrix for which frequencies contain signals of other users and a is a parameter that limits the power of the alignment signal, and $\lambda_u \in [0,1]$ is a weighting factor for the joint optimization of OOB emission and PAPR.

The transmit sample sequence $t_u$ is obtained by converting $T_u = X_u + P_u S_u^*$ from parallel to series. In practical systems, the sample sequence is then converted to an analog waveform, which is amplified using a power amplifier (PA) experiencing amplitude-amplitude and amplitude-phase distortions as is known in the art.

The received samples are given by:

$r = n + \sum_{u=1}^{U}[0_{d_u} \gamma_u(h_u * t_u)]$ where $n \sim \mathcal{CN}(0, \sigma_n^2)$ is background additive white Gaussian Noise (AWGN) of which $\sigma_n$ is defined for various types of user equipment (LTE) and base stations (BW), $h_u \in \mathbb{C}^{L_u}$ is the Rayleigh fading channel coefficients of uth user. To align the alignment signal to the kernel of the receive pulse shape of uth user, the received samples are convolved with the alignment filter of uth user: $r = g_u * r$. As the propagation delay is not known at the receiver, packet timing offset estimation is performed using the cross-correlation between r and transmitted pilot samples $\vartheta_u$, where $\vartheta_u$ is obtained similar to (3) where $Q_u$ is used instead of $(Q_u + D_u)$ in (1) and converted from parallel to series. $R_u \in \mathbb{C}^{N_u + K_u \times I_u}$ is obtained by converting the series synchronized samples to $I_u$ parallel streams of $N_u + K_u$ samples each. Received symbols of the mth subcarrier are obtained using:

$$Y = F_{u,m} B_{u,m} R_u \quad (5)$$

Channel frequency response (CFR) coefficients at pilot tones are estimated by $H_u = Y_u \oslash Q_u$ for nonzero elements of $Q_u$. Remaining CFR coefficients, in-between known coefficients, are interpolated using natural neighbors and the remainder are linearly extrapolated based upon boundary gradients. Finally, data symbols are equalized with zero forcing equalization: $\hat{D}=Y_u \oslash \hat{H}_u$.

The present invention proposes the estimation and utilization of $K_T=[K_{T_1} K_{T_2} \ldots K_{T_U}]$, $K_A=[K_{A_1} \ldots K_{A_U}]$, $K_R=[K_{R_1} K_{R_2} \ldots K_{R_U}]$, $g_u$ and $\lambda_u$ $\forall u$ values that maximize the fair proportional network capacity. Mean channel capacity can be calculated in idealized scenarios using background noise level, received power estimates and expected interference, if hardware effects are not considered. In the various exemplary embodiments, optimum values using realistic simulations that include hardware impairments through numerical methods and present novel metrics that yield near-optimum window lengths and capacity gains, thereby eliminating the need for any optimization process.

Therefore, a routine is proposed that consists of making a heuristic initial guess using the power offset across users, then attempting to converge to the optimal solution, iteratively. The heuristic initial guess is performed in a centralized way by a control unit that monitors the whole coordinated spectrum, such as the base station (BS). In practical implementations, the iterations can also be performed in a centralized way by the same control unit using evolutionary algorithms, or alternatively, the iterations can be performed independently by all nodes in a decentralized manner using a game theoretical approach. Assuming received powers vary slowly over time, evolving optimal lengths also improves robustness against channel variations and evolutionary tracking reduces computational complexity compared to solving nondeterministic polynomial (NT)-complete optimization problems for each resource block.

The heuristic initial guess of the transmitter window length assumes that $K_u$ is fixed. The ratio of received power of the desired link to that of adjacent links is obtained as $\rho_u = \log(\gamma_u / \sqrt{\gamma_{u-1} \gamma_{u+1}})$ at the intended receive of the uth link and shared with the base station (BS) if necessary, i.e., the algorithm can be used for networks in which adjacent uplink (UL), downlink (DL) and sidelink (SL) communication takes place. The BS calculates the uth user's network normalized received power (NNRP) by $\rho_u = \rho_u - \min(\rho) / \max(\rho) - \min(\rho)$, where $\rho = [\rho_1 \rho_2 \ldots \rho_U]$. The transmitter window length guesses are obtained as $\hat{K}_{T_u} = \text{round}(\beta_{K_u} K_u \rho_u)$ so that the user with a higher relative received power uses more CP duration for transmitter windowing, where $\beta_{K_u}$ is a coefficient depending on $K_u$. The alignment filter duration and alignment filter coefficients, as well as $\lambda$ values are also determined based on $\rho$ or P values. The remaining clean CP duration is utilized for receiver windowing, $\hat{K}_{R_u} = K_u - K_{A_u} - \hat{K}_{T_u}$. Coefficients $\beta_K$, for standard K values, are estimated by fitting optimum window lengths obtained from training simulations, and test simulations yield that the values are robust. Optimum window lengths $K_T^*$ and $K_R^*$ are obtained by solving the following combinatorial optimization problem:

The proposed guesses and optimized values for transmitter and receiver windowing is implemented and compared with systems utilizing no windowing, and with systems utilizing whole clean CP duration for transmitter and receiver windowing for Long Term Evolution (LTE) normal ($K_u = N_u 9/128$) and extended ($K_u = N_u 32/1.28$) CP duration.

In an exemplary embodiment, the system parameters are as follows: links 1 and 3, out of a total of U=4, are simulated to be Internet of Things (IoT) UL links having $\Delta f=15$ kHz and each utilize M=48 subcarriers during I=14 OFDM symbols generated by performing N 256-point FFT, whereas links 2 and 4 are simulated to be enhanced-mobile broadband (eNIBB) UL links having=30 kHz and each utilize M=24 subcarriers during I=28 OFDM symbols generated by performing N=128-point FFT. IoT and eMBB devices employ 8 and 14 bit digital-to-analog converters (DACs), respectively, and the BS employs a 16-bit analog-to-digital converter (ADC). LTE cell specific reference signals are used for synchronization and channel estimation. There is 120 kHz fixed guard band between each link. All transmitter and receiver window coefficients are calculated using the per-subcarrier approach. R=2 km and maximum output power of the nodes are determined based upon their device type. All nodes have a mobility of 60 km/h. The optimum values are obtained using an integer genetic algorithm.

Figure 4:
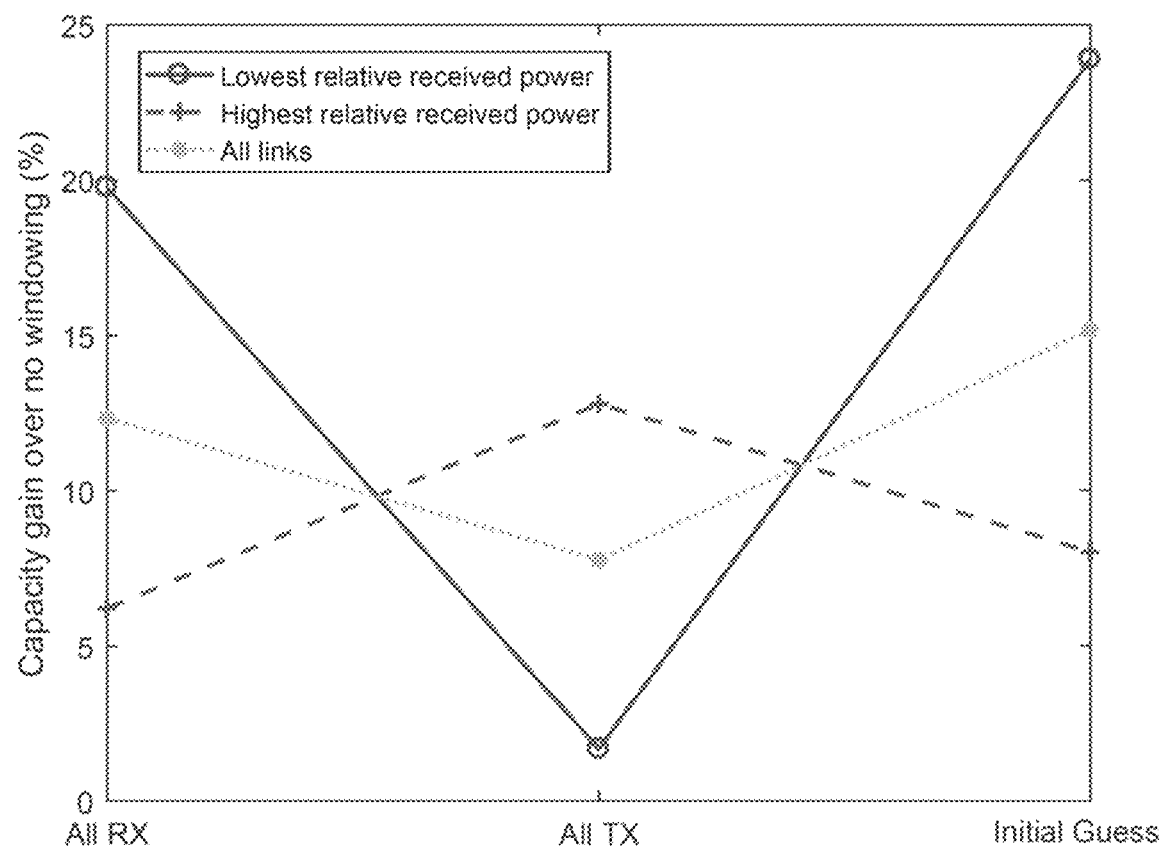
FIG. 4 is a graphical illustration of the percent capacity gain compared to no windowing if whole undisturbed CP duration is used either for receiver windowing, transmitter windowing, or adaptively as the proposed initial guess of the optimization for the links with lowest and highest relative received power and the mean of all links. Alignment signals are not utilized in obtaining the results presented in this figure, and the initial guess refers to the case where transmitter windowing durations are equal to "guess" values presented in FIG. 6, with complementary receiver windowing durations.

The capacity gains of links over no windowing is given in FIG. 4. It can be seen that the link with lowest relative received power benefits more from receiver windowing compared to transmitter windowing, and the opposite applies to the link with the highest relative received power, proving the reasoning of the present invention. However, it can be seen that overall network capacity, along with the capacity of the link with the lowest relative received power is maximized even when window lengths are per the calculated initial guess.

Figure 5:
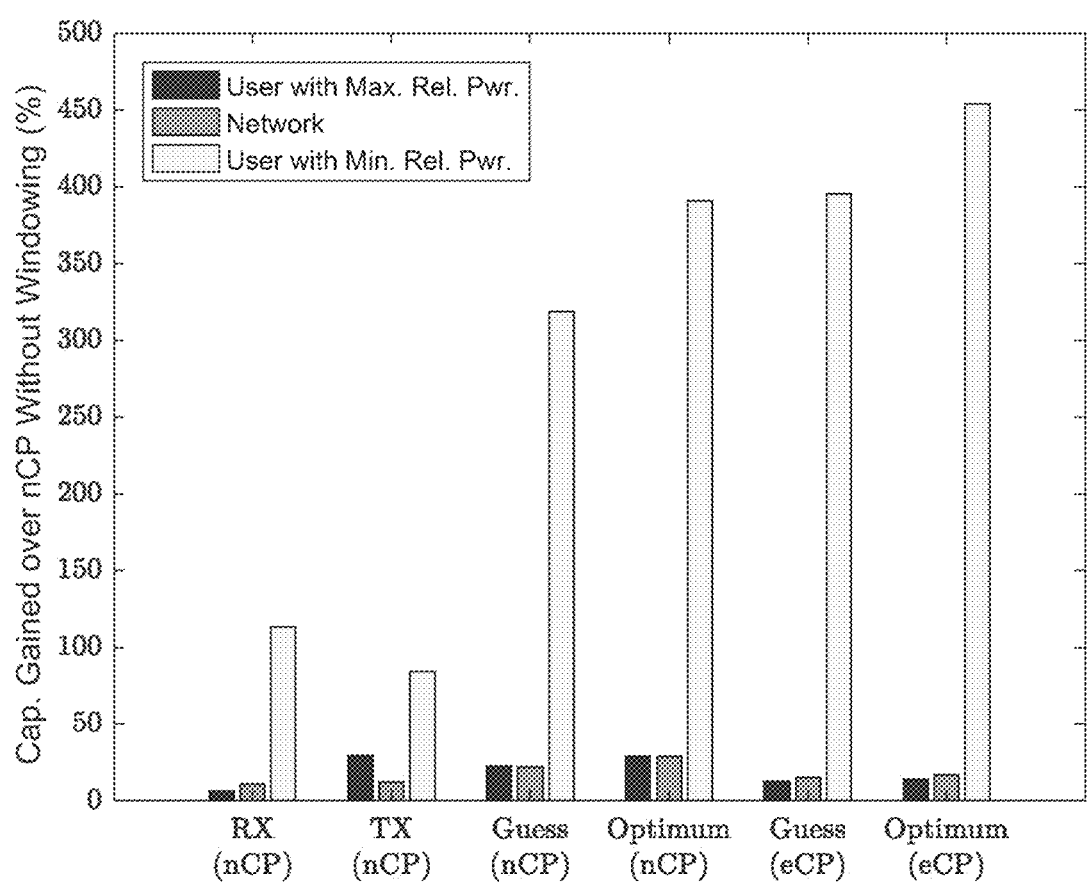
FIG. 5 is a graphical illustration of a percent capacity gain of the method of the present invention over a no-windowing condition if the entire clean CP duration is used either for receiver or transmitter windowing, solely, adaptively as guessed and optimized, for LTE normal and extended CP, of the links with the lowest and highest NNRP and the network average. Alignment signals are not utilized in obtaining the results presented in this figure, and the guess refers to the case where transmitter windowing durations are equal to "guess" values presented in FIG. 6, with complementary receiver windowing durations.

The capacity gains over no windowing are illustrated in FIG. 5. It can be seen that adaptive windowing guesses outperform windowing whole clean CP exclusively at the transmitters or the receiver in terms of overall network, capacity and the capacity of the link with the lowest relative received power. Mean network capacity gained by using guesses and optimum window durations are 22% and 28%, respectively, for normal CP, and 15% and 16%, respectively, for extended CP. One interesting observation is that although the highest network capacity is achieved using normal CP, the lowest NNRP links further benefit from extended CP, due to improved interference management. This effect is not preserved in the network level as the capacity loss due to extended effective symbol duration outweighs the benefits of reduced ACI for higher power users.

Figure 6:
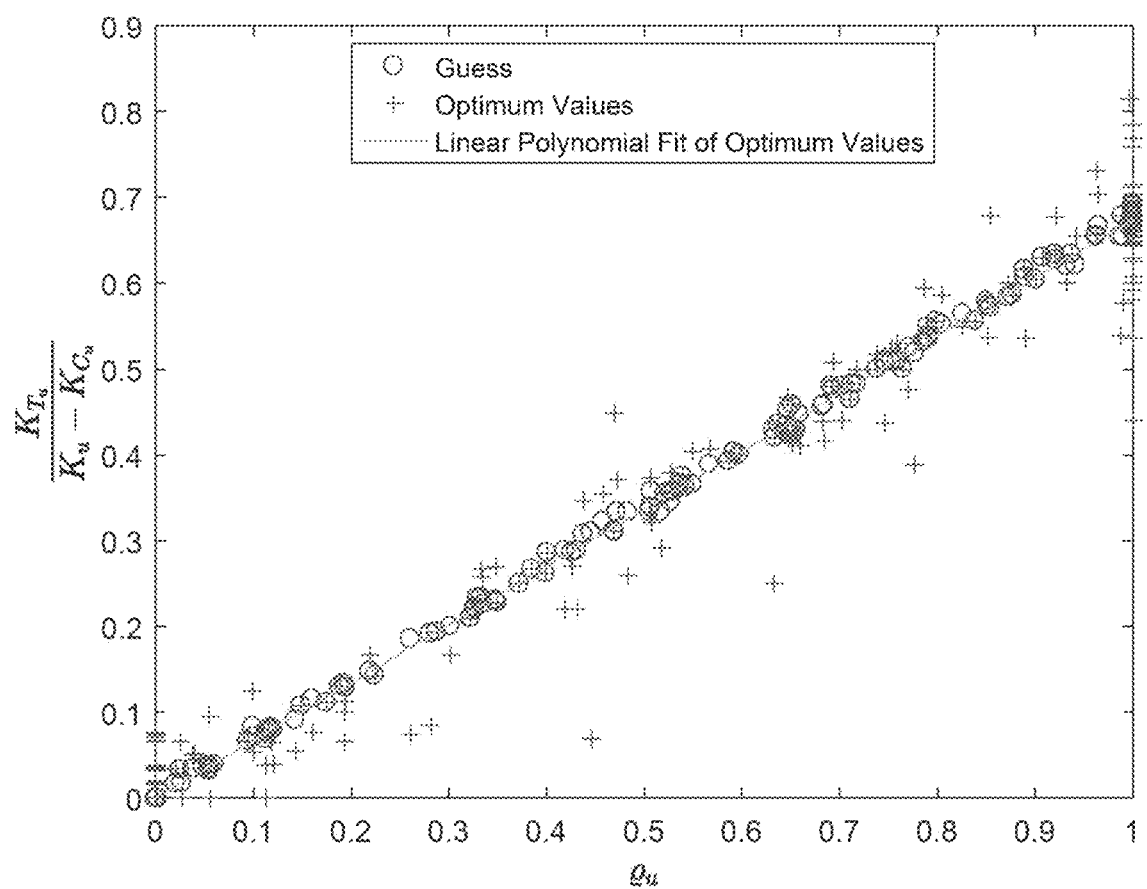
FIG. 6 is a graphical illustration of initial guesses, optimum values and best-fit of the optimum values of the ratio of clean CP utilized for transmitter windowing to total clean CP duration, as a function of NNRP for extended CP duration. Alignment signals are not utilized in obtaining the results presented in this figure.

FIG. 6 is a scatter-plot illustrating the ratio of guesses and optimum transmitter windowed CP to the total extended clean CP against NNRP, as well as the linear polynomial fit of the optimum points. The fits yield adjusted $R^2$ values of 0.9938 and 0.9996 for normal and extended CP, respectively $$K_T^*, K_R^* = \underset{K_T, K_R}{\arg} \quad (7)$$

where $$C_u = \frac{M_u^2 \Delta f_u}{N_u + K_u} \log\left(1 + \frac{1}{\mathbb{E}\{Q_u \times (R_u(Q_u \neq 0))^H\}}\right)$$

is the nth link's capacity, where $\Delta f_u$ is the uth link's subcarrier spacing.

$$\beta_{\frac{9N}{128}} \text{ and } \beta_{\frac{32N}{128}}$$

were estimated as 0.88 and 0.674 from the results of the training period of 64 random networks (with 4 users in each, a total of 256 values were obtained) and used in the guessing of initial values for the test set, while estimates obtained from the optimal values of the independent test set of 64 random networks are 0.8571 and 0.6731, respectively.

It has been shown that the capacity of lower NNRP links is limited by interference of higher power links. Links with lower power thus benefit more from receiver windowing. Links with higher NNRP experience relatively less interference, thus should focus more on reducing their emission by performing transmitter windowing with most of their clean CP for the sake of the network. However, as clean CP becomes abundant, the network capacity gain from reduced OOB emissions, resulting from further increasing transmitter window durations, diminishes and the network benefits more from increased capacity of the high powered users, yielding an inversely proportional relationship between μ and K. NNRP proves to be an effective metric in guessing window lengths maximizing network capacity and the links with the lowest NNRP. Links with the lowest relative received powers benefit from better interference management if extended CP lengths are utilized, however the network average reduces due to increased effective symbol duration.

Hardware distortions are the factor limiting the capacity of high relative received power links, Utilizing transmitter windowing becomes more beneficial than receiver windowing for links with higher relative received powers. Capacity of lower relative receive power links is limited by interference, so links with lower relative received power benefit more from receiver windowing. Ratio of the received power of the desired signal to that of interfering signals is an effective metric in guessing the initial window lengths. Applying transmitter and receiver windowing by considering these ratios increases the average capacity and energy efficiency of the network, as well as that of the links with the lowest relative receive powers.

In an additional exemplary embodiment of the system and method of the present invention, it is assumed that there are U transmitters sharing a bandwidth B using a transmitter and receiver windowed OFDM symbol system. In this discussion of this exemplary embodiment, $(\cdot)^T$, $(\cdot)^*$ and $(\cdot)^H$ denote the transpose, conjugate and Hermitian operations, A[a, b] is the element in the ath row and bth column of matrix A, A⊙B and A⊘B correspond to Hadamard multiplication and division of matrices A and B and A by B, $A^{\odot 2}$ refers to A⊙A*, $0_{a \times b}$ and $1_{a \times b}$ denotes matrices or zeros and ones with A rows and B columns, $\mathcal{CN}(\mu, \sigma^2)$ represents complex Gaussian random vectors with mean μ and variance $\sigma^2$.

Figure 7:
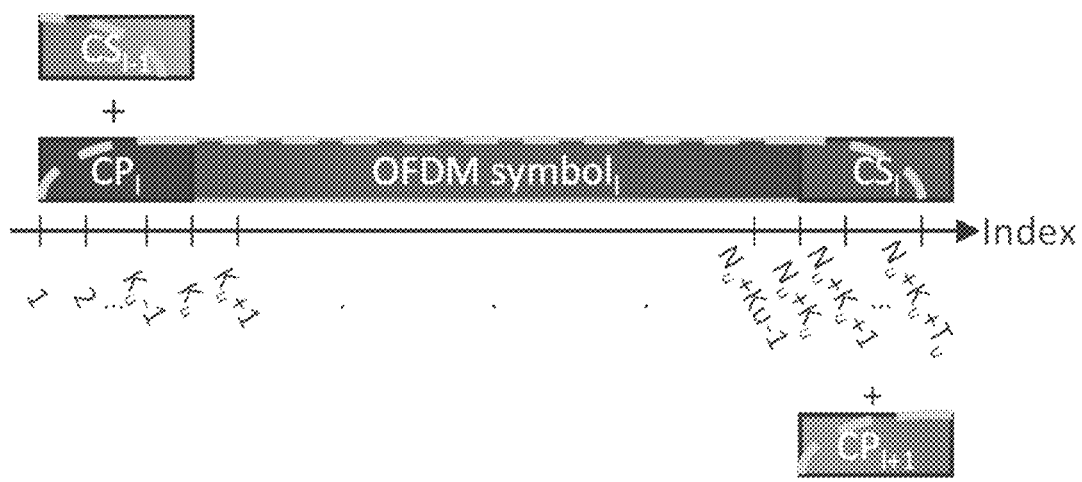
FIG. 7 is an illustration demonstrating how the transmitter windowed samples are generated by overlapping scaled CPs and CSs of consecutive OFDM symbols of which indices are given in the subscripts, in accordance with an embodiment of the present invention.

In this embodiment, it is assumed that one node, referred to as the next generation Node B (gNB), aims to receive the information transmitted by all transmitters correctly, and all transmitters intend to convey information to this node; a situation that commonly arises in UL reception. Each transmitter u samples this band using an $N_u$-point Fast Fourier Transformation (FFT), so that the frequency spacing between the points at the FFT output becomes $\Delta f_u = B/N_u$. The quantity $\Delta f_u$ is referred to as the subcarder spacing of user u. Each user u utilizes some $M_u$ subcarriers with indices $\{M_{u,0}, \ldots, M_{u,0}+M_{u,0}-1\}$ out of the possible $N_u$ for a duration of $L_u$ OFDM symbols, while the remaining subcarriers are left empty for use by other users. Symbols that are known by the gNB, commonly referred to as pilot symbols, are transmitted during some subcarriers of some OFDM symbols for time synchronization and channel estimation purposes. The pilot symbols of user u are contained in the sparse matrix $P_u \in \mathbb{C}^{M_u \times L_u}$, of which nonzero element indices are defined as the element of a set $\tilde{\mathbb{I}}_u$. The single carrier (SC) data symbols of user u are contained in matrix $D_u \in \mathbb{C}^{M_u \times L_u}$, where the indices of non zero elements of $D_u$ are defined as $\mathbb{I}_u = \{(m,l) | m \in \mathbb{N}_{\leq M_u}^* \cap l \in \mathbb{N}_{\leq L_u}^* \cap (m,l) \notin \tilde{\mathbb{I}}_u\}$. A cyclic prefix of length $K_u$ samples is appended to each time domain OFDM symbol to mitigate multipath propagation and prevent ISI. Of these $K_u$ samples, $T_u \in \mathbb{N}_{\leq K_u}$ are used for transmitter windowing, which results in a $T_u$ sample cyclic suffix (CS) extension. The transmit pulse shape of the mth subcarrier of the uth user is kept the same throughout all L symbols, is contained in the vector $t_{m,u} \in \mathbb{R}^{(K_u+N_u+T_u) \times 1}$ of which indexing is demonstrated in FIG. 7. It is worth noting that $t_{m,u} \equiv t_{M_u-m+1,u}$, for complexity purposes. The tth sample of the baseband sample sequence to be transmitted by the uth transmitter $x_u \in \mathbb{C}^{((K_u+N_u)L_u+T_u) \times 1}$, is obtained as:

$$x_u[t] = \sum_{l=\lfloor \frac{t-1}{N_u+K_u} \rfloor}^{\lfloor \frac{t-1}{N_u+K_u} \rfloor +1} \sum_{m=1}^{M_u} t_{m,u}[t-(N_u+K_u)(l-1)] \quad (8)$$
$$(P_u[m,l]+D_u[m,l])e^{j2\pi(m+M_{u,0}-1)(t-K_u-1)/N_u},$$

for $t \in \mathbb{N}_{\leq (K_u+N_u)L_u+T_u}$, $t_{m,u}[t]:=0$, $\forall t \in \mathbb{N}_{>N_u+K_u+T_u}$ and $P_u[m, 0]:=D_u[m,0,]:=P_u[m,L_u+1]:=D_u[m, L_u+1]:=0$, $\forall m \in \mathbb{N}_{\leq M_u}$. All transmitters then transmit their waveforms over the multiple access multipath channel. The channel path gains are Raleigh fading with Jakes' Doppler spectrum. The normalized complex channel gain of the cluster that carries the samples transmitted by uth transmitter and arrives at the gNB at the tth sample after a propagation delay of τ samples is denoted by the complex coefficient $h_{u,\tau,t}$. Then the tth received sample is written as:

$$y[t] = \tilde{n} + \Sigma_{u=1}^U \Sigma_{\tau=0}^{t-\Delta_{t,u}-1} \sqrt{\gamma_u} h_{u,\tau,t} x_u[t-\Delta_{t,u}-\tau], t \in \mathbb{N}^*, \quad (9)$$

where $x_u[t]:=0$, $\forall t \in \mathbb{N}_{>(K_u+N_u)L_u+T_u}$, $\forall t \in \mathbb{N}_{\leq N_u}^*$, $\tilde{n} \sim \mathcal{CN}(0,1)$ is the background additive white Gaussian noise (AWGN), $\gamma_u$ is the signal-to-noise ratio (SNR) of uth user's received signal and $\Delta_{t,u}$ is the timing offset of uth user in number of samples. The gNB then synchronizes to the signal of each user in time domain by correlating the received samples with samples generated only using $P_u \forall t \in \mathbb{N}_{\leq U}^*$ and estimates $\Delta_{t,u}$.

The samples estimated to contain uth user's uth OFDM symbol and its corresponding CP are denoted by vectors $y_{l,u}^{OFDM} \in \mathbb{C}^{N_u \times 1}$ and $y_{l,u}^{CP} \in \mathbb{C}^{K_u \times 1}$, respectively, where $y_{l,u}^{SYM}[s] = y[(l-1)(N_u+K_u)+\Delta_{t,u}+K_u+s]$, $s \in \mathbb{N}_{\leq N_u}^*$ and $y_{l,u}^{CP}[s] = y[(l-1)(N_u+K_u)+\Delta_{t,u}+K_u+s]$, $s \in \mathbb{N}_{\leq N_u}^*$. The gNB uses a receiver windowing pulse shape $r_{m,u} \in \mathbb{R}^{N_u+K_u) \times 1}$ calculated with a receiver windowing duration of $R_u \in \mathbb{N}_{\leq k_u}$ to receive the nth subcarrier of all OFDM symbols transmitted by uth transmitter. Let the pulse shape parts scaling the OFDM symbol and CP be denoted by $r_{m,u}^{SYM} \in \mathbb{C}^{N_u \times 1}$ and $r_{m,u}^{CP} \in \mathbb{C}^{K_u \times 1}$, respectively, where $r_{m,u}^{SYM}[s] = r_{m,u}[K_u+s]$, $s \in \mathbb{N}_{\leq N_u}^*$ and $r_{m,u}^{CP}[s] = r_{m,u}[s]$, $s \in \mathbb{N}_{\leq K_u}^*$. The SC symbol received in uth user's lth OFDM symbol's mth subcarrier is then calculated as:

$$Y_u[m,l] = F_{m+M_{u,0}-1,N_u}\left(y_{l,u}^{SYM} \odot r_{m,u}^{SYM} + \begin{bmatrix} 0_{N_u-K_u \times 1} \\ y_{l,u}^{CP} \odot r_{m,u}^{CP} \end{bmatrix}\right) \quad (10)$$

where $F_{m+M_{u,0}-1,N_u} \in \mathbb{C}^{1 \times N_u}$ is the $(m+M_{u,0}-1)$th row of the normalized $N_u$-point FFT matrix $F \in \mathbb{C}^{N_u \times N_u}$. Channel frequency response (CFR) coefficients at pilot tones are estimated as $\hat{H}_u[\tilde{\mathbb{I}}_u] = Y_u[\tilde{\mathbb{I}}_u] \oslash P_u[\tilde{\mathbb{I}}_u]$. Remaining CFE coefficients in-between known coefficients are interpolated using natural neighbors and the remainder are linearly extrapolated based on boundary gradients. Finally, data symbols are equalized: $\hat{D}[\tilde{\mathbb{I}}_u]=Y_u[\tilde{\mathbb{I}}_u] \oslash \hat{H}_u[\tilde{\mathbb{I}}_u]$.

Figure 8:
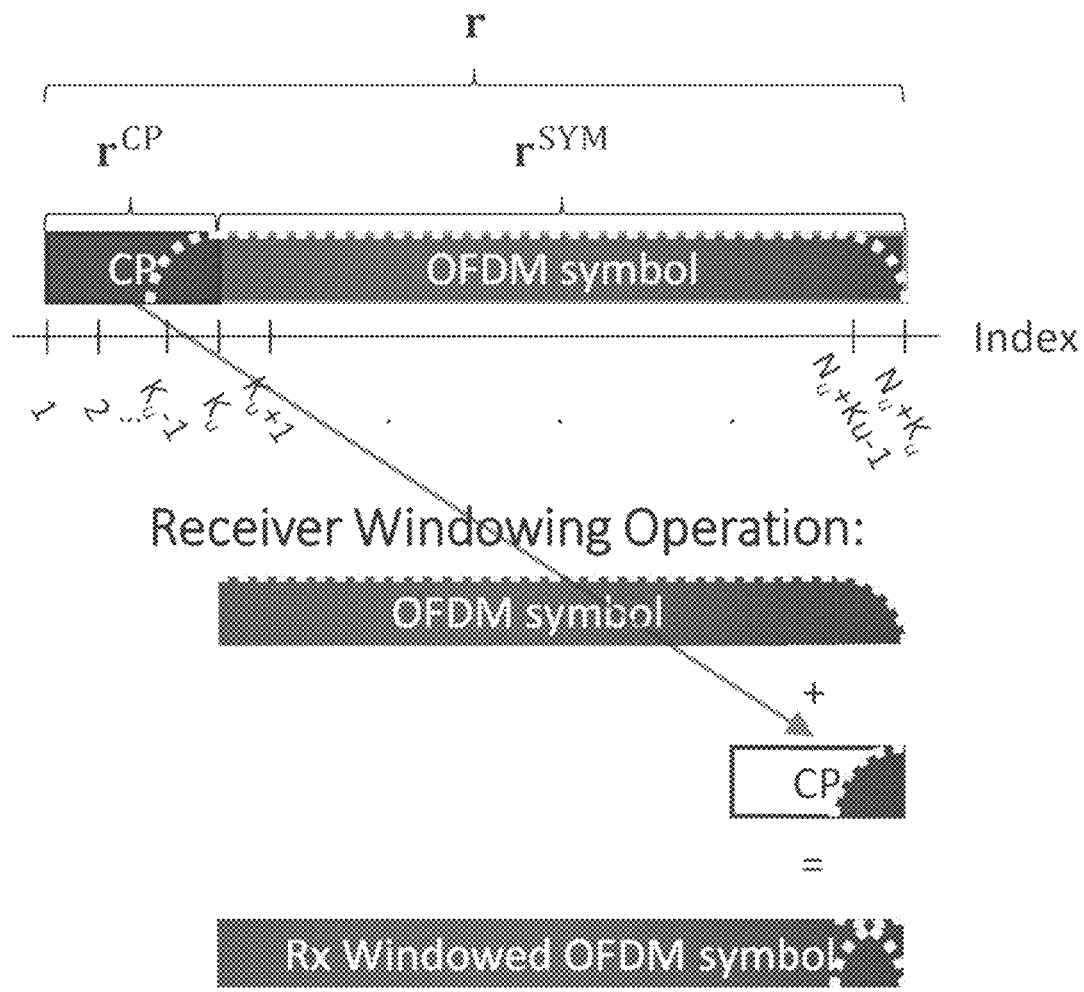
FIG. 8 is an illustration demonstrating how indexing and identification of CP and symbol parts are used in a receiver windowing operation, in accordance with an embodiment of the present invention.

FIG. 8 illustrates the indexing of r and identification of its parts $r^{CP}$ and $T^{SYM}$ within a demonstration of how the receiver windowing operation of the present invention is performed.

In the proposed method of the present invention, the mean spectral efficiency of uth user is:

$$\eta_u = \frac{M_u L_u}{(N_u + K_u)L_u + T_u} \mathbb{E}\left\{\log_2\left(1 + \frac{1}{|D_u[\mathbb{I}_u] - \hat{D}_u[\mathbb{I}_u]|^{\odot 2}}\right)\right\} \quad (11)$$

$$\simeq \frac{M_u}{N_u + K_u} \mathbb{E}\left\{\log_2\left(1 + \frac{1}{|D_u[\mathbb{I}_u] - \hat{D}_u[\mathbb{I}_u]|^{\odot 2}}\right)\right\} \quad (12)$$

as $(N_u+K_u)L_u \gg T_u$, which converges rather quickly for practical values used in all recent standards. The proportional fair network spectral efficiency is then $\eta = \Pi_{u=1}^U \eta_u$. The present invention proposes estimating and utilizing and $\{T_1, T_2, \ldots, T_U\}$ $\{R_1, R_2, \ldots, R_U\}$ values that maximize $\eta$. Since the arguments of the proposal involve modifying neither the response allocation nor the symbol and CP durations, the focus is solely on the expectation:

$$\tilde{\eta}_u = \mathbb{E}\left\{\log_2\left(1 + \frac{1}{|D_u[\mathbb{I}_u] - \hat{D}_u[\mathbb{I}_u]|^{\odot 2}}\right)\right\}, \quad (13)$$

thus reducing the problem to $$\left\{\begin{array}{c} T_1^*, T_2^*, \ldots, T_1^* \\ R_1^*, R_2^*, \ldots, R_1^* \end{array}\right\} = \begin{array}{c} \text{argmax} \\ T_1, T_2, \ldots, T_U \\ R_1, R_2, \ldots, R_U \end{array} \prod_{u=1}^U \tilde{\eta}_u \quad (14)$$

subject to $T_u, R_u \in \mathbb{N}_{\leq K_u}$, $\forall t \in \{1, 2, \ldots, U\}$.

A review of the system model reveals that while $\tilde{n}_u$ depends heavily on $R_u$, it also depends on the transmit window durations of all users. An analytical solution to this high complexity discrete multivariate optimization problem was not yet shown to exist. However, the power offset across users sharing adjacent bands can be inferred to be a useful metric upon careful investigation of the system model in making an initial guess for the solution of the problem.

In another exemplary embodiment, the system model has been realized with U=2 users transmitting a frame of 140 OFDM symbols to a base station. 256 realizations with independent and random user data and instantaneous channels were generated and window durations maximizing $\Pi_{u=1}^U \tilde{n}_u$ were calculated using coordinate descent optimization for various power offset values for each instant. Known parameters for link level waveform evaluation under 6 GHz were used, when possible. Users sample B=15.36 MHz with $N_1=2N_2=1024$-point FFTs, making $\Delta f_1=15$ kHz and $\Delta f_2=30$ kHz. Both users utilize a normal CP overhead of 6.7% with no additional extension for windowing, thus conversing 5G new radio (NR) frame structure. User 1 symbolizes an IoT device and experience a tapped delay line (TDL)-C channel power delay profile (PDP) with 300 ns RMS delay spread, and 3 km/h mobility; whereas user 2 symbolizes a slow vehicle and experience a TDL-B channel PDP with 100 ns RMS delay spread, and 30 km/h mobility and $\Delta_{t-1}-\Delta_{t-2}=128$. $P_u$ and $\tilde{\mathbb{I}}_u$ are applied from the physical uplink shared channel (PUSCH) demodulation reference signal design without transform preceding, configuration type 1, mapping type A, UL-DMRS-add-pos equals 1 for a PUSCH duration of 14 symbols and single-symbol DM-RS. $\gamma_{72}=20$ dB in all instances, whereas $\gamma_1$ is swept from 10 dB to 20 dB. The presented results are the mean of the shown metric obtained over all realizations.

For $M_1=2M_2=504$, by utilizing such resource allocation, either user affects and gets affected from the other user equally in both edges of their utilized bandwidth due to the periodicity of the EFT spectrum. This reduces the number of variables and uncertainty in the system and allows demonstration of the concept clearly with two users. For example, if the recommendation of 4 resource blocks (RBs) per use was used, to users could have only interfered with each other from only the adjacent edges of their bandwidths, as the images of the opposite edges are far from each other in the repeated spectra. The demonstrate the idea in such an environment, much higher number of users are required to cover the whole spectrum, creating further variables in the system model and complicating it, thereby preventing clear demonstration of the concept. Such advanced problems and cases may be covered in future work. For example, if the user utilizing the lower-frequency adjacent channel of a user has a relatively lower power, whereas the user utilizing the higher-frequency adjacent channel has a relatively higher power to that user, the solution can be applied partially for each side of the desired user.

Figure 9:
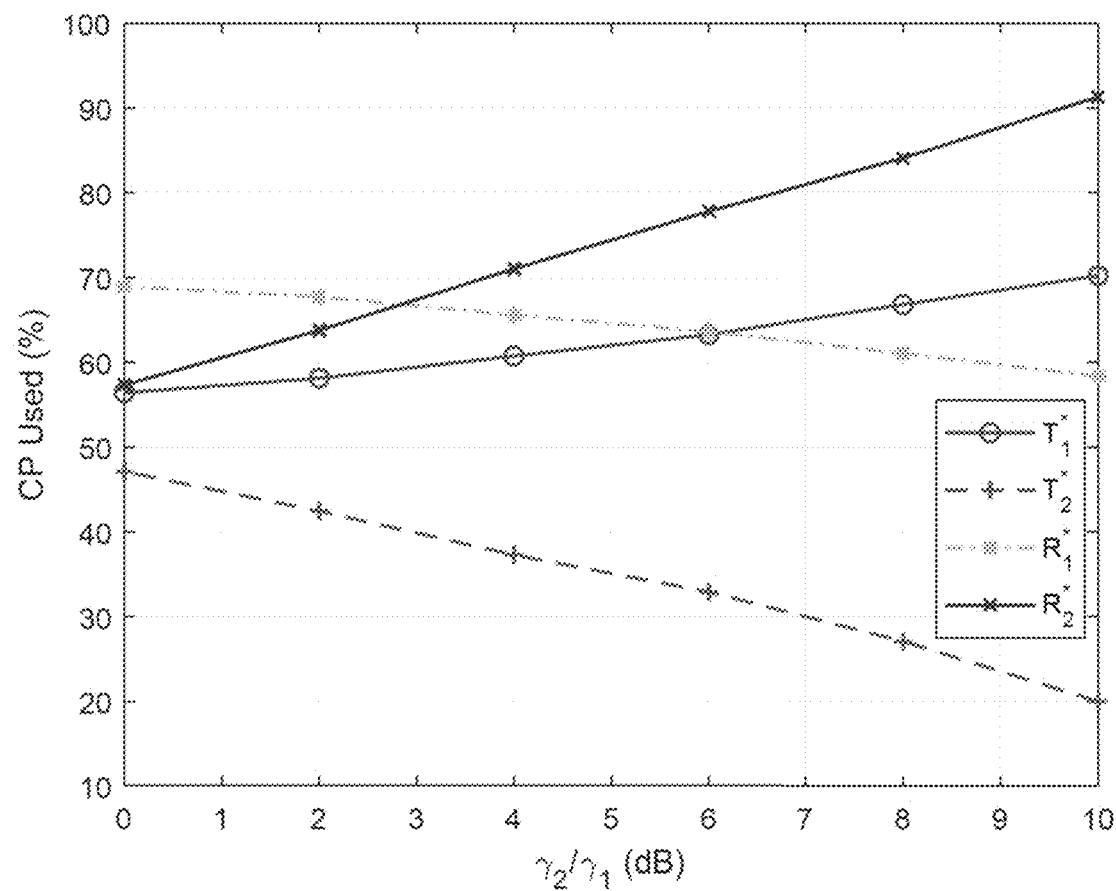
FIG. 9 is a graphical illustration of the optimum transmit (T) and receive (R) window durations of a two user network as a function of the power offset between them. Alignment signals are not utilized in obtaining the results presented in this figure.

The transmit and receive window durations of both users that maximize network spectral efficiency can be seen in FIG. 9. The values provided in FIG. 9 are presented as percentages of window duration to the total CP duration of the corresponding user. It can be clearly seen that the more one user outpowers the other, the outpowering user must employ more transmit windowing and less receiver windowing, whereas the user being outpowered must employ less transmit windowing and more receiver windowing. The difference of optimum durations in the no-offset case demonstrates the dependence on the channel conditions.

Figure 10:
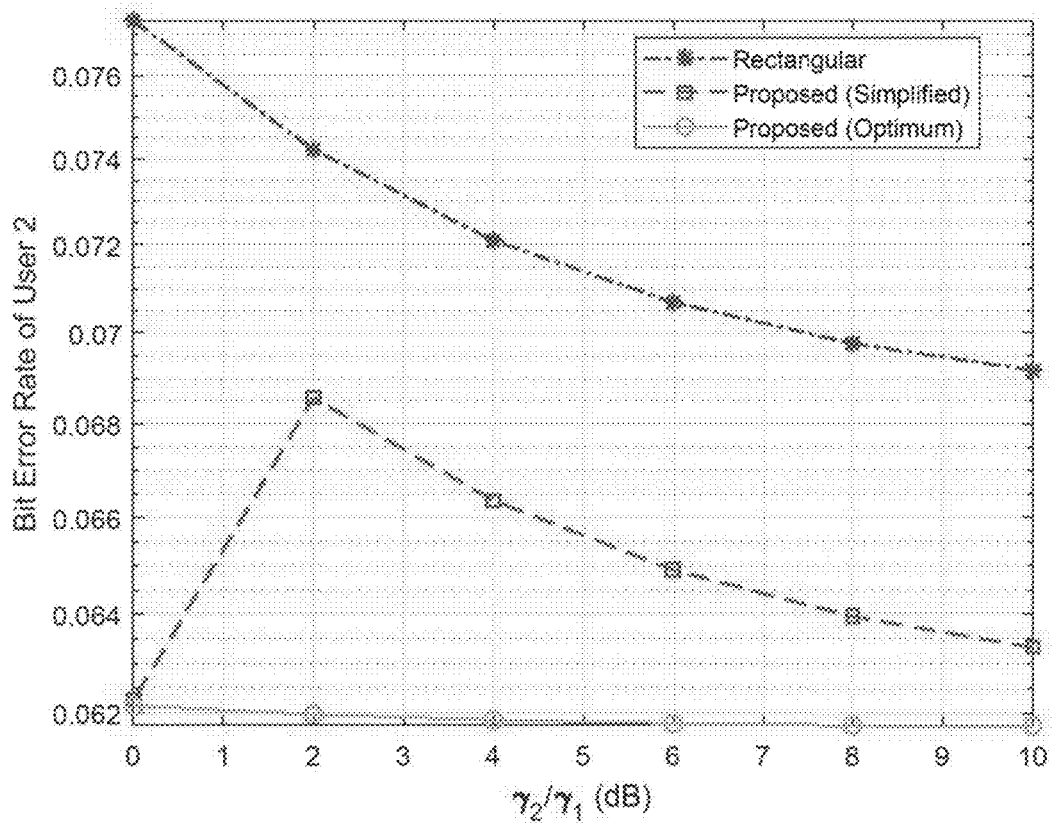
FIG. 10 is a graphical illustration of the BER of the outpowering user as a function of the power offset for various windowing algorithms. The rectangular algorithm refers to the transceiver described in FIG. 2, whereas proposed (simplified) and proposed (optimum) algorithms refer to the algorithms presented in FIG. 1B, Alignment signals are not utilized in obtaining the results presented in this figure.
Figure 11:
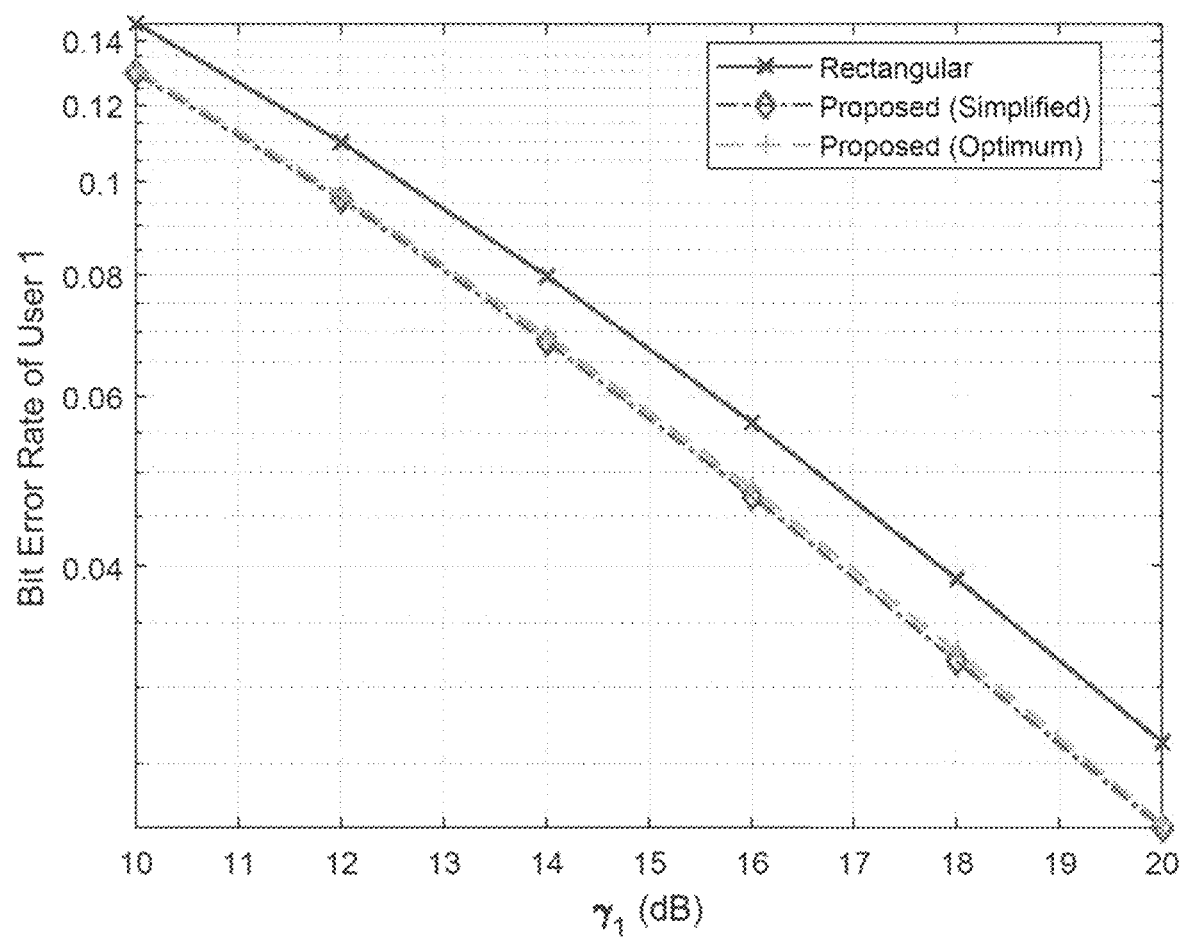
FIG. 11 is a graphical illustration of the BER of the outpowered user as a function of their SNR for various windowing algorithms. The rectangular algorithm refers to the transceiver described in FIG. 2, whereas proposed (simplified) and proposed (optimum) algorithms refer to the algorithms presented in FIG. 1a Alignment signals are not utilized in obtaining the results presented in this figure.
Figure 12:
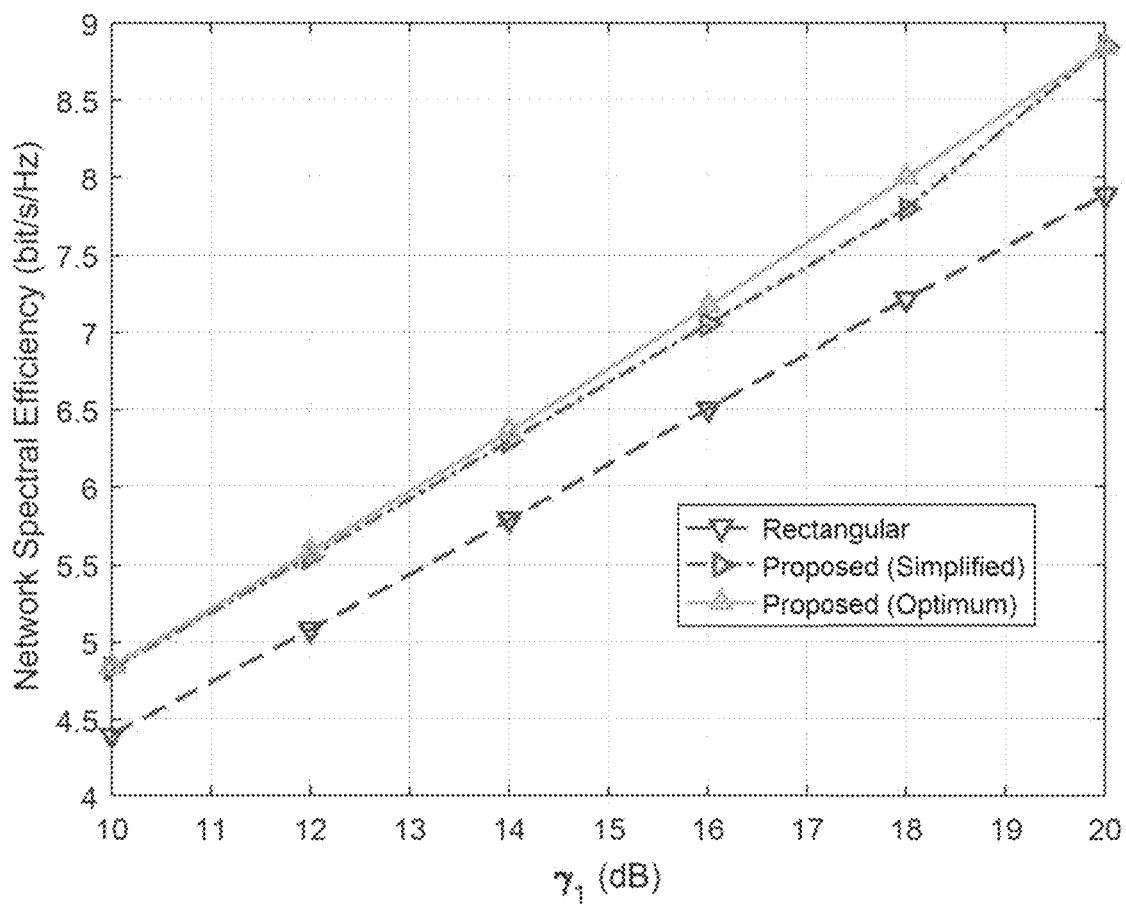

FIG. 10-FIG. 12 feature several performance outcomes comparing three windowing algorithms. The first and the baseline algorithm is the case where both users utilize rectangular windowing, that is $T_1=T_2=R_1=R_2=0$, $\forall_{\gamma_1,\gamma_2}$. The second algorithm is a simplified version, wherein regardless of the amount of power offset between users, the outpowering user windows the whole CP duration at the transmitter whereas the user being outpowered windows the whole CP duration at the receiver. In the case of no power offset, they each use half the CP duration at the transmitter and the other half at the receiver. The third algorithm corresponds to the optimum flexible solution that maximizes network spectral efficiently as proposed in the present invention.

In FIG. 10, the bit-error rate (BER) performance of the outpowering user for the three cases is shown as a function of the power offset across users. User 2 modulates their SC data symbols using 64-QAM. Although is has higher power than the outpowered signal, the outpowered signal still interferes with it, of which energy reduces as the power offset among the two signals increases. This results in better performance and lower error rates, as shown. The performance of the simplified algorithm compared to the baseline algorithm shows that although the simplified algorithm does not perform any action that explicitly improves the reception of the current user of interest, the transmitter windowing employed reduces the ICI outpowering user experiences due to the mobility of the channel and improves the reception. This phenomenon is not limited to mobility and can be observed in the presence of any time varying effect in the communication system, such as phase noise, which is another common problem that has a serious impact on future high frequency devices and low cost devices. The performance of the simplified algorithm applied in the absence of power offset is highly similar to that of the optimum solution, implying that the two algorithms converge in this extreme case. In any case, the optimum solution which does not solely focus on the performance of the outpowering user is the algorithm that improves the BER performance of the outpowering user the most as well. It can also be seen that the optimum solution conserves the BER performance of the outperforming user over the outpowered user's SIR.

The BER performance of the outpowered user as a function of their SNR can be seen in FIG. 11. User 1 always modulates their SC data symbols using 16-QAM, regardless of instantaneous SNR. It should be noted that except for the no-poweroffset case, actions performed in the simplified proposed algorithm are solely focused to maximize the performance of the outpowered user by utilizing all resources to solely minimize the interference affecting it. It can be seen that both the simplified and the optimum proposed algorithms yield very similar performance that outperforms that of the baseline receiver in any case as expected. Therefore, one can conclude from FIG. 10 and FIG. 11 that the proposed optimum algorithm aims to maximize the performance delivered to the outpowering user without sacrificing from the performance of the outpowered user as a result of the fairness implemented in the algorithm.

The proportional fair network spectral efficiency n obtained using each algorithm as a function of the outpowered user's SNR is shown in FIG. 12. It can be seen that even the simplified proposed algorithm has a gain of at least 0:43 (bit/s)/Hz gain over the baseline algorithm, while the optimum algorithm provides further gain. Another observation is that the simplified and optimum algorithms differ most at low power offset values and converge to the same values for no power offset or relatively higher power offset values.

This exemplary embodiment demonstrates the concept of 5G frame structure compliant power offset based extension less windowing to maximize network spectral efficiency. The more one user outpowers the other, the outpowering users must window available extensions more at the transmitter side and less at the receiver side to help reduce their impact on the network, whereas the outpowered users must do the opposite and focus on improving their own performance. The optimum window durations are highly dependent on the power offset across users utilizing adjacent channels, but also depend on the channel conditions and resource allocation. Compared to the simplified "window whole CP on one side depending on the sign of the power offset" solution, finding the optimum solution allows improving the performance of the outpowering user while conserving the performance of the outpowered user, regardless of the amount of power offset. Depending on the channel conditions and the severity of time varying effects in the channel and the hardware, transmitter windowing also improves the spectral efficiency of the user applying it. This phenomenon is observable even for slower speeds of 30 km/h. Finding optimum windowing durations is most beneficial when the power offset between adjacent users is less than 6 dB; if the power offset is more, windowing whole CP in either side yields similar results. The performance analysis of the proposed idea for other resource allocation scenarios by extending it to per-subcarrier transmitter and receiver windowing durations and a solver using machine learning techniques may be provided in the future.

The present invention may be embodied on various computing platforms that perform actions responsive to software-based instructions and most particularly on touch-screen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. An adaptive windowing method for cellular communication networks, the method comprising:
   determining a network normalized received power (NNRP) for each of a plurality of links between a transmitter and a receiver in a cellular communication network;
   determining a NNRP relative ranking for each of the plurality of links, wherein the NNRP relative ranking is based upon the NNRP of each of the plurality of links relative to the other plurality of links;
   increasing transmitter windowing for each of the plurality of links having a higher NNRP relative ranking; and
   increasing receiver windowing for each of the plurality of links having a lower NNRP relative ranking.

2. The method of claim 1, where the NNRP is determined using one or more SNR values, and wherein the one or more SNR values are selected from all users used to calculate the NNRP, only the SNR values of a user of interest and the users utilizing adjacent bands to the user of interest, only the NNRP of the user of interest and the NNRP of all users of the cellular communication network.

3. The method of claim 1, further comprising aligning an alignment signal on top of the transmitter windowing.

4. The method of claim 3, wherein the alignment signal reduces out-of-band (OOB) emissions on the cellular communication network.

5. The method of claim 3, wherein the alignment signal reduces PAPR of the waveforms employed in the cellular network.

6. The method of claim 3, wherein optimizing an alignment filter duration of the alignment signal reduces ACI on the cellular communication network.

7. The method of claim 3, further comprising designing the alignment signal and an alignment filter associated with the alignment signal, wherein designing the alignment signal and associated alignment filter further comprises:
   maximizing optimization weight of bands containing signal of links having a higher NNRP relative ranking in the design of the frequency response of the alignment filter;
   maximizing optimization weight of step response linearity in the design of the alignment filter for links having a higher NNRP relative ranking and maximizing optimization weight for frequency response in the design of the alignment filter for links having a lower NNRP relative ranking; and
   maximizing optimization weight of OOB emission reduction in the design of the alignment signal for links having a higher NNRP relative ranking and maximizing optimization weight of PAPR reduction in the design of the alignment signal for links having a lower NNRP relative ranking.

8. The method of claim 1, further comprising optimizing one or more of transmitter windowing, alignment filter duration, alignment filter coefficients, optimization weights between PAPR and OOB emission reduction of alignment signals and receiver windowing to maximize a capacity of the cellular communication network.

9. The method of claim 1, further comprising decreasing transmitter windowing for links having a lower NNRP relative ranking and decreasing receiver windowing for links having a higher NNRP relative ranking.

10. The method of claim 1, wherein transmitter windowing reduces out-of-band (OOB) emissions on the cellular communication network.

11. The method of claim 1, wherein receiver windowing reduces adjacent channel interference (ACI) on the cellular communication network.

12. A system for adaptive windowing method of cellular communication networks, the system comprising:
   a plurality of transmitters and a plurality of receivers in a cellular communication network;
   a base station coupled to the plurality of transmitters and to the plurality of receivers, the base station configured for:
      determining a network normalized received power (NNRP) for each of a plurality of links between a transmitter of the plurality of transmitters and a receiver of the plurality of receivers in the cellular communication network;
      determining a NNRP relative ranking for each of the plurality of links, wherein the NNRP relative ranking is based upon the NNRP of each of the plurality of links relative to the other plurality of links;
      increasing transmitter windowing for each of the plurality of links having a higher NNRP relative ranking; and
      increasing receiver windowing for each of the plurality of links having a lower NNRP relative ranking.

13. The system of claim 12, where the NNRP is determined using one or more SNR values, and wherein the one or more SNR values are selected from all users used to calculate the NNRP, only the SNR values of a user of interest and the users utilizing adjacent bands to the user of interest, only the NNRP of the user of interest and the NNRP of all users of the cellular communication network.

14. The system of claim 12, wherein the base station is further configured for aligning an alignment signal on top of the transmitter windowing.

15. The system of claim 14, wherein the base station is further configured for designing the alignment signal and an alignment filter associated with the alignment signal, wherein designing the alignment signal and associated alignment filter further comprises:
   maximizing optimization weight of bands containing signal of links having a higher NNRP relative ranking in the design of the frequency response of the alignment filter;
   maximizing optimization weight of step response linearity in the design of the alignment filter for links having a higher NNRP relative ranking and maximizing optimization weight for frequency response in the design of the alignment filter for links having a lower NNRP relative ranking; and
   maximizing optimization weight of OOB emission reduction in the design of the alignment signal for links having a higher NNRP relative ranking and maximizing optimization weight of PAPR reduction in the design of the alignment signal for links having a lower NNRP relative ranking.

16. The system of claim 12, wherein the base station is further configured for comprising optimizing one or more of transmitter windowing, alignment filter duration, alignment filter coefficients, optimization weights between PAPR and OOB emission reduction of alignment signals and receiver windowing to maximize a capacity of the cellular communication network.

17. The system of claim 12, wherein the base station is further configured for decreasing transmitter windowing for links having a lower NNRP relative ranking and decreasing receiver windowing for links having a higher NNRP relative ranking.

18. One or more non-transitory computer-readable media having computer-executable instructions for performing a method of running a software program on a computing device, the computing device operating under an operating system, the method including issuing instructions from the software program comprising:
   determining a network normalized received power (NNRP) for each of a plurality of links between a transmitter and a receiver in a cellular communication network;
   determining a NNRP relative ranking for each of the plurality of links, wherein the NNRP relative ranking is based upon the NNRP of each of the plurality of links relative to the other plurality of links;
   increasing transmitter windowing for each of the plurality of links having a higher NNRP relative ranking; and
   increasing receiver windowing for each of the plurality of links having a lower NNRP relative ranking.

19. The media of claim 18, where the NNRP is determined using one or more SNR values, and wherein the one or more SNR values are selected from all users used to calculate the NNRP, only the SNR values of a user of interest and the users utilizing adjacent bands to the user of interest, only the NNRP of the user of interest and the NNRP of all users of the cellular communication network.

20. The media of claim 18, further comprising computer-executable instructions for aligning an alignment signal on top of the transmitter windowing.

21. The media of claim 18, further comprising computer-executable instructions for designing the alignment signal and an alignment filter associated with the alignment signal, wherein designing the alignment signal and associated alignment filter further comprises:
   maximizing optimization weight of bands containing signal of links having a higher NNRP relative ranking in the design of the frequency response of the alignment filter;
   maximizing optimization weight of step response linearity in the design of the alignment filter for links having a higher NNRP relative ranking and maximizing optimization weight for frequency response in the design of the alignment filter for links having a lower NNRP relative ranking; and
   maximizing optimization weight of OOB emission reduction in the design of the alignment signal for links having a higher NNRP relative ranking and maximizing optimization weight of PAPR reduction in the design of the alignment signal for links having a lower NNRP relative ranking.

22. The media of claim 18, further comprising computer-executable instructions for decreasing transmitter windowing for links having a lower NNRP relative ranking and decreasing receiver windowing for links having a higher NNRP relative ranking.

* * * * *